(12) United States Patent
Wijning

(10) Patent No.: US 12,276,253 B2
(45) Date of Patent: Apr. 15, 2025

(54) ASSEMBLING AND INSTALLING A WIND TURBINE

(71) Applicant: Itrec B.V., Schiedam (NL)

(72) Inventor: Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 18/033,169

(22) PCT Filed: Oct. 19, 2021

(86) PCT No.: PCT/EP2021/078979
§ 371 (c)(1),
(2) Date: Apr. 21, 2023

(87) PCT Pub. No.: WO2022/084330
PCT Pub. Date: Apr. 28, 2022

(65) Prior Publication Data
US 2023/0392583 A1    Dec. 7, 2023

(30) Foreign Application Priority Data

Oct. 22, 2020   (NL) .................................... 2026734
Feb. 3, 2021   (NL) .................................... 2027488
Mar. 19, 2021   (NL) .................................... 2027781

(51) Int. Cl.
| | | |
|---|---|---|
| *F03D 13/25* | (2016.01) | |
| *B63B 1/10* | (2006.01) | |
| *B63B 35/00* | (2020.01) | |
| *B63B 77/10* | (2020.01) | |
| *B66C 23/18* | (2006.01) | |
| *F03D 13/10* | (2016.01) | |
| *F03D 13/40* | (2016.01) | |

(52) U.S. Cl.
CPC .............. *F03D 13/25* (2016.05); *B63B 1/107* (2013.01); *B63B 35/003* (2013.01); *B63B 77/10* (2020.01);
(Continued)

(58) Field of Classification Search
CPC ........... B63B 1/107; B63B 1/12; B63B 1/121; B63B 2001/123; B63B 35/003;
(Continued)

(56) References Cited

U.S. PATENT DOCUMENTS 4,613,001 A * 9/1986 Edberg .................... E21B 19/15
175/85
6,524,049 B1 * 2/2003 Minnes ............... B63B 35/4413
414/22.63
(Continued)

FOREIGN PATENT DOCUMENTS

CN    106014874 A    10/2016
CN    206634171 U    11/2017
(Continued)

OTHER PUBLICATIONS

International Search Report, issued in PCT/EP2021/078979, dated Apr. 8, 2022.
(Continued)

*Primary Examiner* — Ajay Vasudeva
(74) *Attorney, Agent, or Firm* — Birch, Stewart, Kolasch & Birch, LLP

(57) ABSTRACT

A semi-submersible crane vessel for use in assembling a wind turbine and for installation by means of a crane of the vessel of the assembled wind turbine on a foundation. At an assembly station, the hull of the vessel is provided with a mast-receiving well that is sunk into, or through, the hull, preferably a well that extends into, or through a support column of the hull, which well is configured to receive therein at least a portion of the mast of the wind turbine during an assembly step of the wind turbine. For example, the mast-receiving well has a depth of at least 15 meters, e.g. at least 30 meters, measured from the deck of the deckbox structure.

19 Claims, 17 Drawing Sheets

Figure 1E:
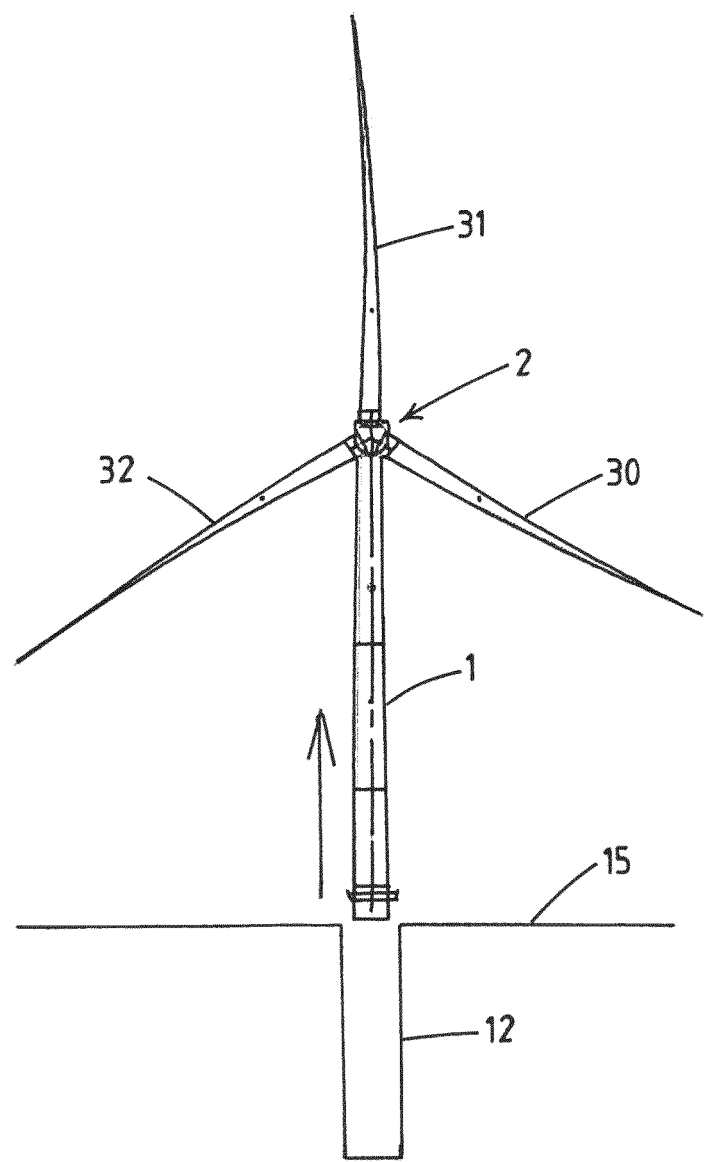

(52) U.S. Cl.
CPC ............ *B66C 23/185* (2013.01); *F03D 13/10* (2016.05); *F03D 13/126* (2023.08); *F03D 13/40* (2016.05); *F03D 13/401* (2023.08); *F03D 13/402* (2023.08); *F05B 2230/6102* (2013.01); *F05B 2240/95* (2013.01); *Y02E 10/727* (2013.01)

(58) Field of Classification Search
CPC .......... B63B 2035/44; B63B 2035/446; B63B 77/00; B63B 77/10; B63B 2003/147; F05B 2230/6102; F05B 2240/95; F03D 13/126; F03D 13/139; F03D 13/25; F03D 13/40; F03D 13/401; F03D 13/402; B66C 23/185; B66C 23/60; Y02E 10/72; Y02E 10/727
See application file for complete search history.

(56) References Cited

U.S. PATENT DOCUMENTS

| | | | |
|---|---|---|---|
| 2010/0293781 A1 | 11/2010 | Foo et al. | |
| 2012/0266796 A1 | 10/2012 | Roodenburg et al. | |

FOREIGN PATENT DOCUMENTS

| | | | | | |
|---|---|---|---|---|---|
| EP | 2 585 712 | A1 | | 5/2013 | |
| KR | 10-2012-0072537 | A | | 7/2012 | |
| KR | 20120072537 | A | * | 7/2012 | ............ B63B 35/44 |
| KR | 10-2017-0107629 | A | | 9/2017 | |
| WO | WO 2009/131826 | A2 | | 10/2009 | |
| WO | WO-2011103988 | A1 | * | 9/2011 | ............ B63B 1/107 |
| WO | WO 2012/002809 | A1 | | 1/2012 | |
| WO | WO 2014/014343 | A1 | | 1/2014 | |
| WO | WO 2014/058117 | A1 | | 4/2014 | |
| WO | WO-2019245366 | A1 | * | 12/2019 | ............ B63B 1/107 |
| WO | WO2020/085902 | A1 | | 4/2020 | |
| WO | WO-2020197405 | A1 | * | 10/2020 | |
| WO | WO-2021212173 | A1 | * | 10/2021 | ............... B63B 1/12 |

OTHER PUBLICATIONS

Written Opinion of the International Searching Authority, issued in PCT/EP2021/078979, dated Apr. 8, 2022.

* cited by examiner

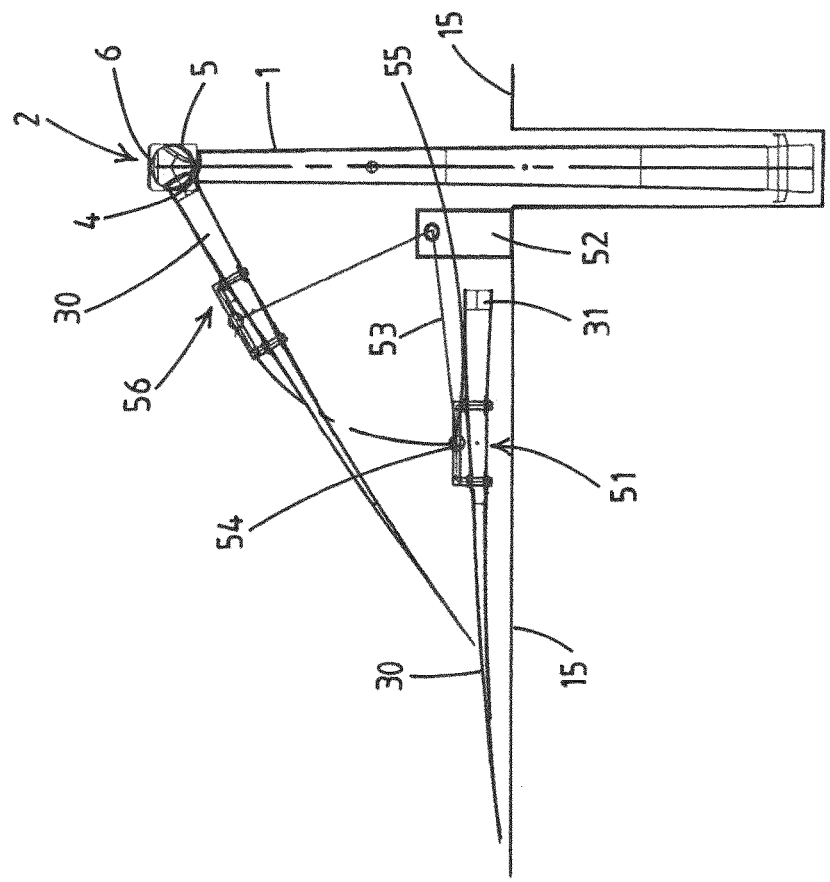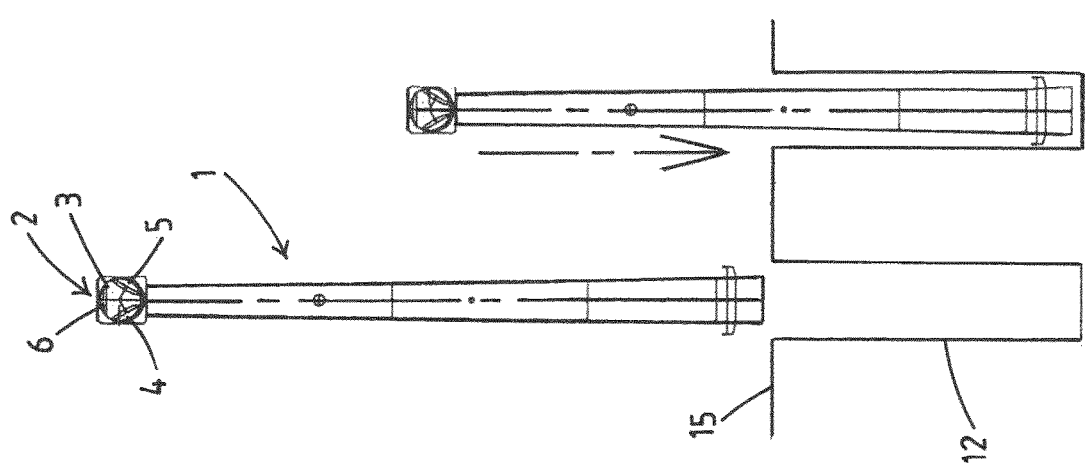

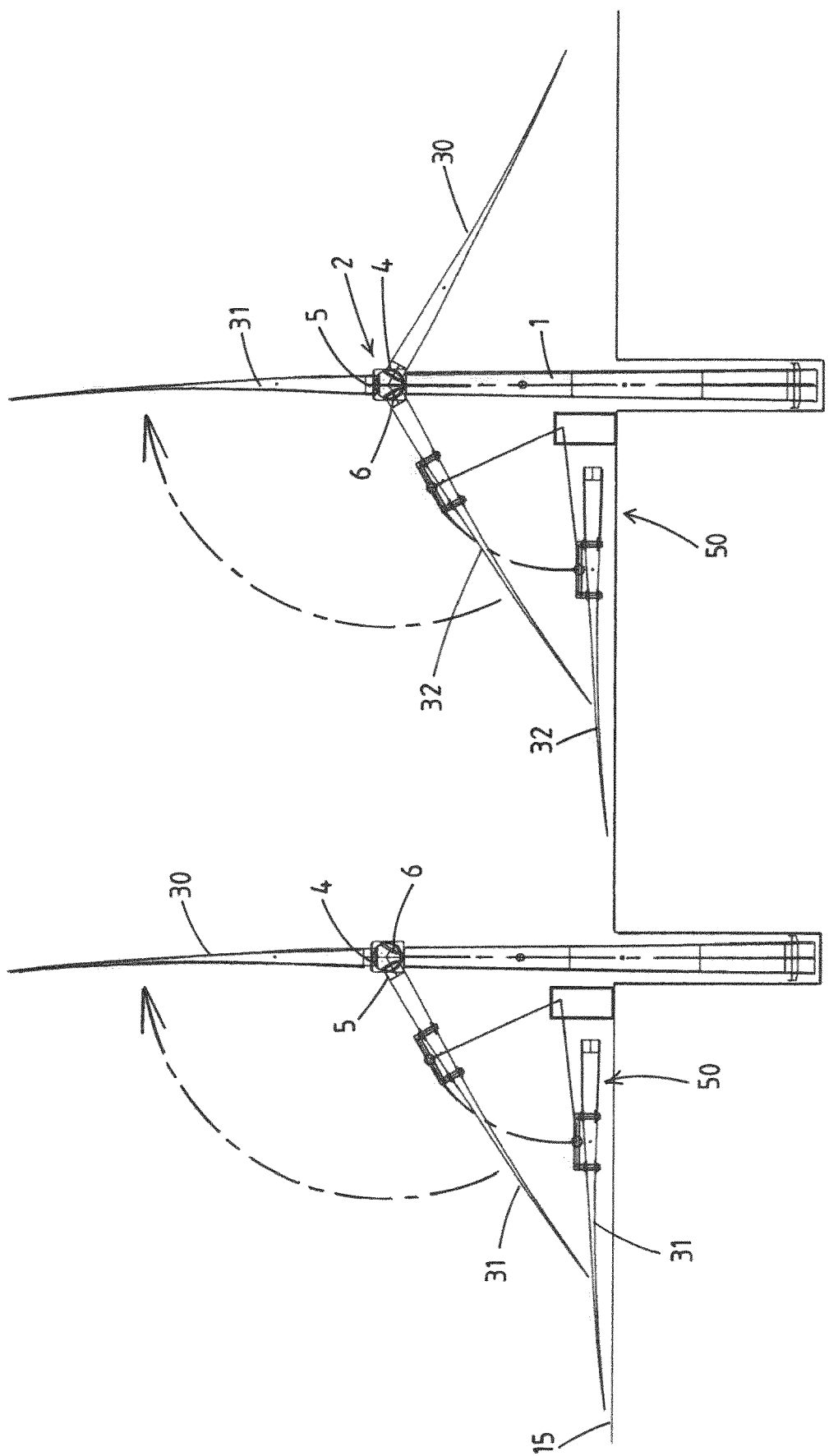

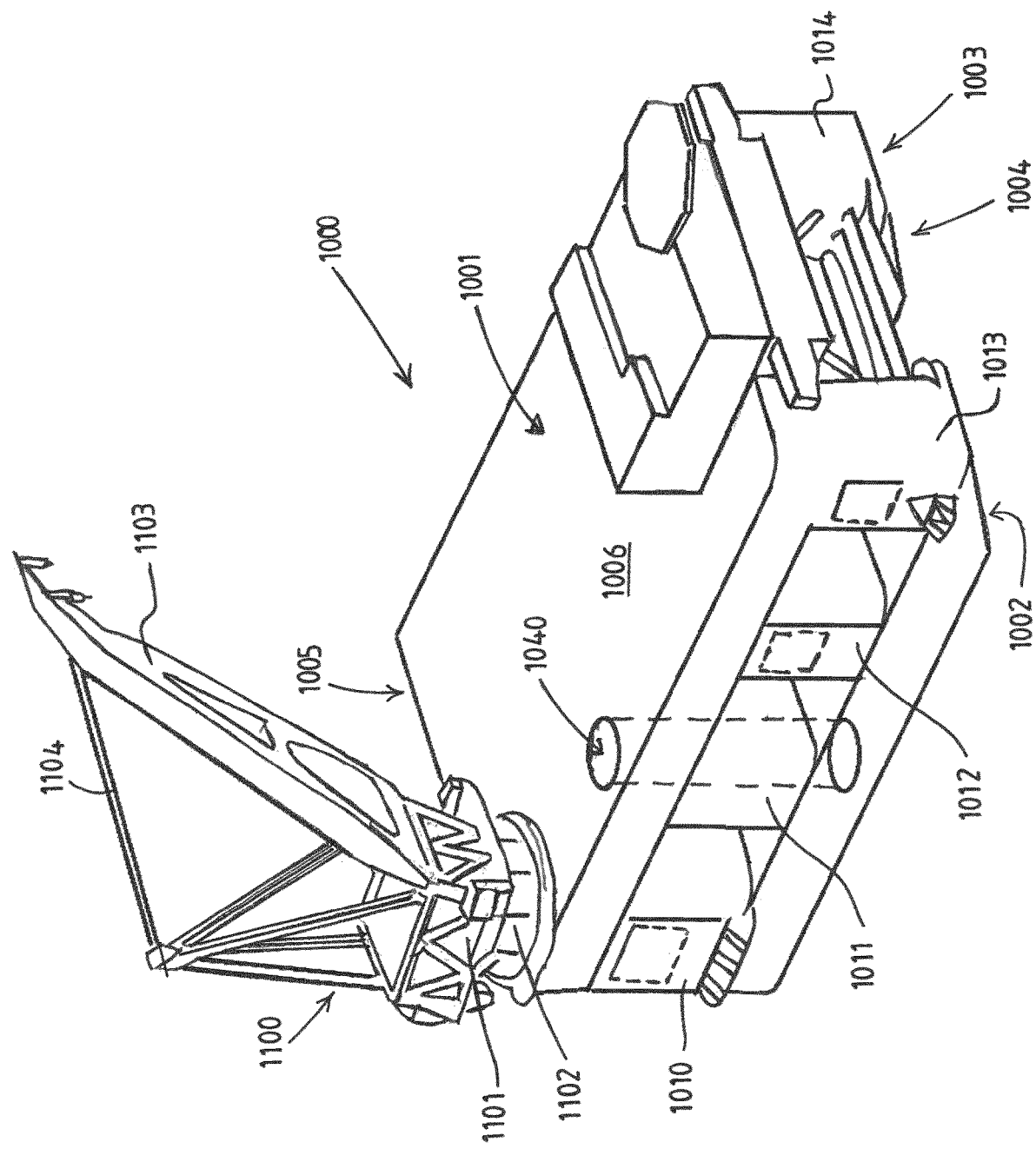

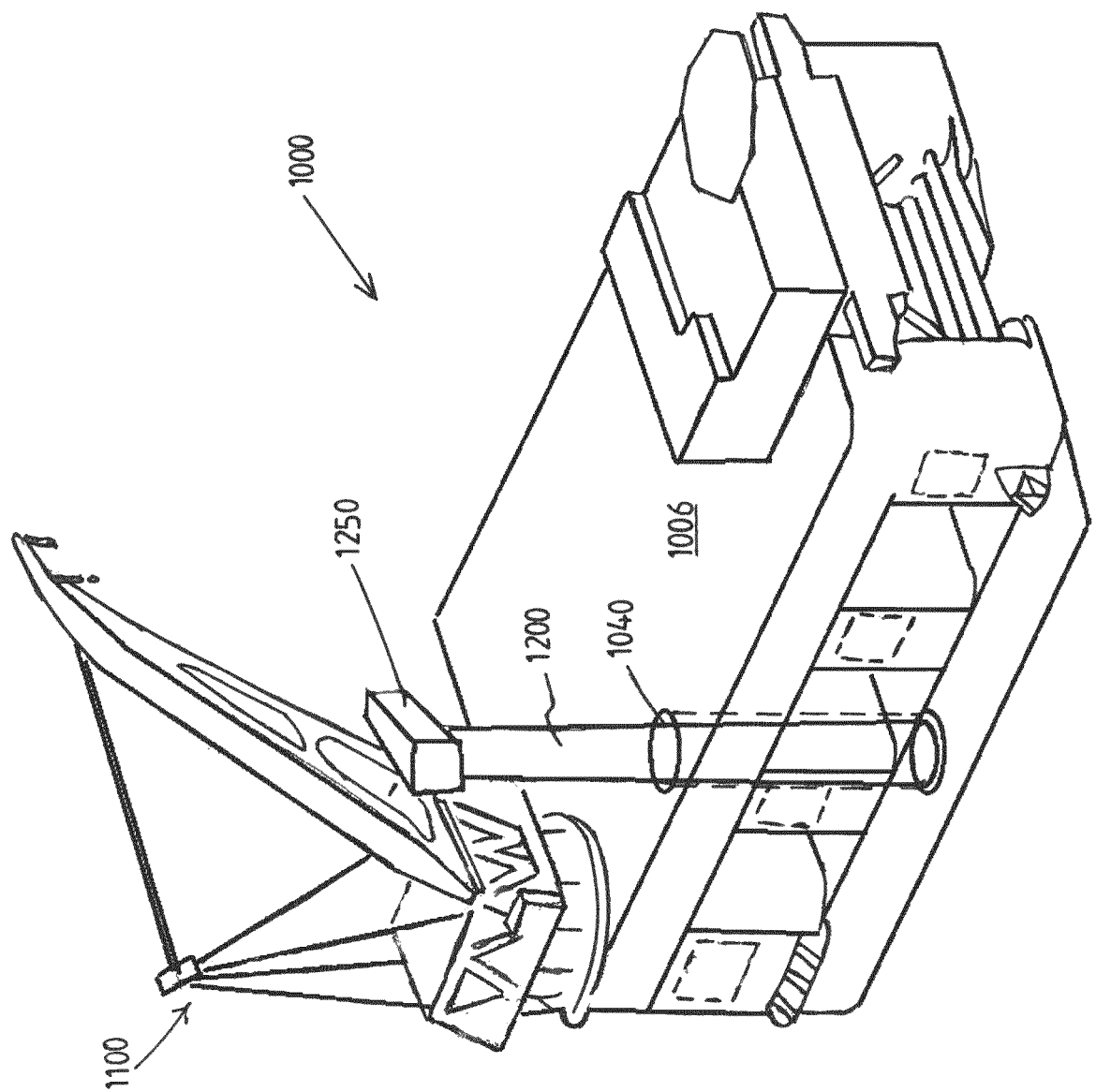

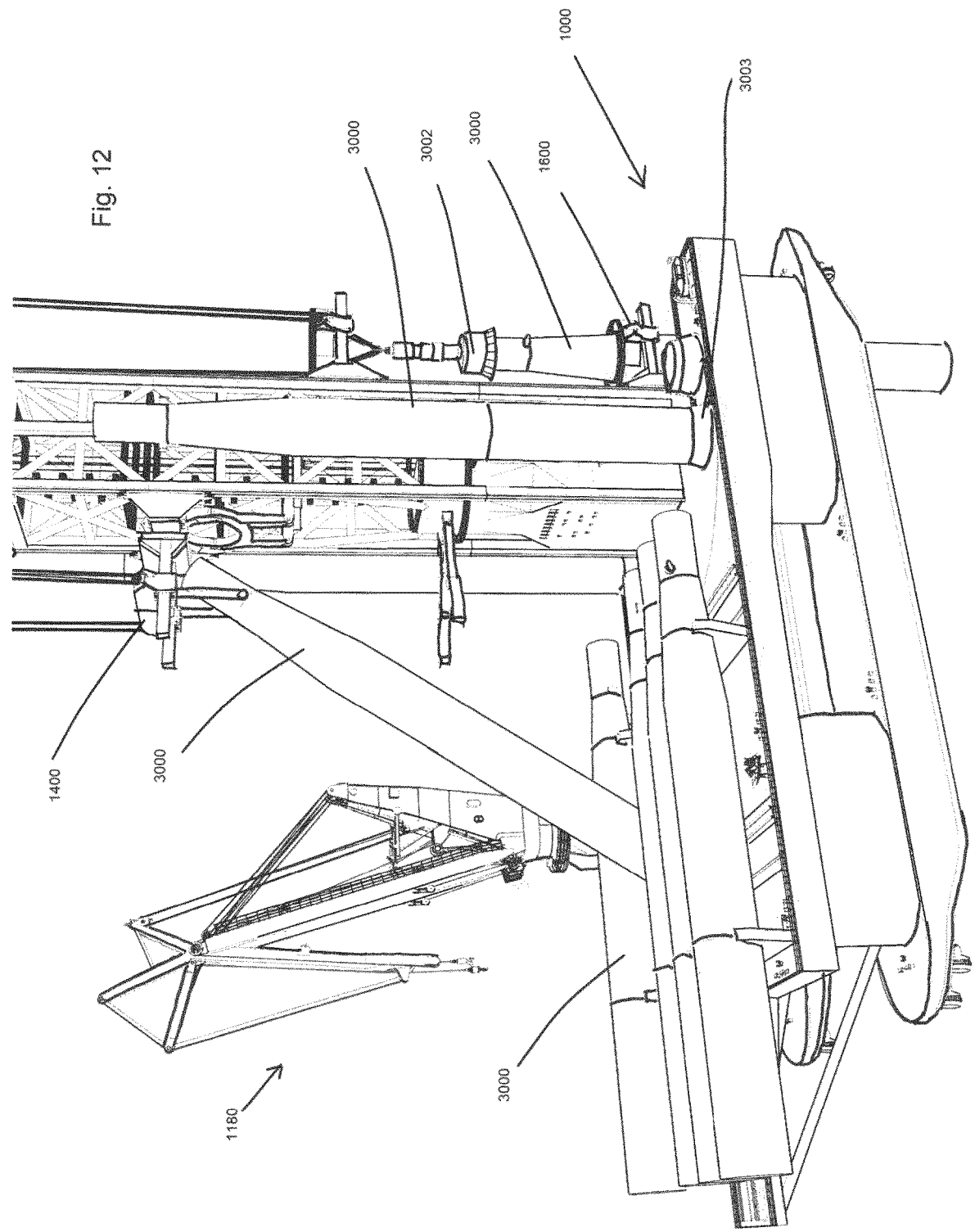

ASSEMBLING AND INSTALLING A WIND TURBINE

In the field of offshore construction semi-submersible crane vessels are known as the workhorse for (heavy) lifting activities. These crane vessel are nowadays also employed for the installation of wind turbines on a foundation. Commonly such a semi-submersible crane vessel comprises:
- a floating hull with:
  - a deckbox structure,
  - two parallel pontoons,
  - a row of support columns extending upward from each of the two pontoons, the support columns supporting thereon the deckbox structure,
  - wherein the deckbox structure has a deck and a box bottom, and
  - an installation crane mounted on the deckbox structure and configured to install the assembled wind turbine on the foundation.

In the field, many of the vessel have a tub mounted crane, wherein the slewable superstructure of the crane is mounted via a bearing, e.g. a roller bearing or an arrangement of bogies, on a tub that is integral with the deckbox structure, e.g. directly above a support column at the end of a row of columns. In other known embodiment, the crane is a mast crane.

A first aspect of the present invention also aims to provide an enhanced semi-submersible crane vessel for use in wind turbine installation, e.g. allowing for more effective assembly of (a part of) the wind turbine on-board of the crane vessel.

The first aspect of the present invention provides a semi-submersible crane vessel for use in assembling a wind turbine and for installation by means of a crane of the vessel of the assembled wind turbine on a foundation, e.g. a sea-bed mounted foundation or a floating foundation, wherein the assembled wind turbine to be installed comprises at least a part of a wind turbine mast and a rotor assembly that is mounted on the mast, e.g. a nacelle having a hub, which rotor assembly is, optionally, provided with one or more, e.g. all, of the rotor blades,
- wherein the vessel comprises:
  - a floating hull with:
    - a deckbox structure,
    - two parallel pontoons,
    - a row of support columns extending upward from each of the two pontoons, the support columns supporting thereon the deckbox structure,
  - wherein the deckbox structure has a deck and a box bottom,
  - an installation crane mounted on the deckbox structure and configured to install the assembled wind turbine on the foundation,
  - wherein, at an assembly station, the hull of the vessel is provided with a mast-receiving well that is sunk into, or through, the hull, preferably a well that extends into, or through a support column of the hull, which well is configured to receive therein at least a portion of the mast of the wind turbine during an assembly step of the wind turbine, e.g. during mounting of the rotor assembly on the mast and/or during assembly of one or more, e.g. all, of the rotor blades to the rotor assembly.

For example, each mast-receiving well has a depth of at least 15 meters, e.g. at least 30 meters, measured from the deck of the deckbox structure.

In embodiments, the installation crane is mounted directly above a support column at the end of a row of columns, for example as a tub mounted crane, and a mast-receiving is provided in the adjacent support column of the same row of columns on the pontoon.

In another embodiment, the installation crane has a crane structure base that is fixed on a part of the deckbox structure that extends between a portside support column and a starboard side support column of the vessel, at one of the bow side and stern side of the deckbox structure.

In an embodiment, the semi-submersible vessel has a portside pontoon and a starboard-side pontoon, wherein a portside mast-receiving well extends in the portside support column and a starboard side mast-receiving well extends in the starboard-side support column.

In an embodiment, the installation crane has a slewable superstructure that is supported on the crane structure base via a slew bearing allowing to revolve the superstructure, preferably over 360 degrees, about a vertical slew axis. In an embodiment, the superstructure is provided with a boom, and the crane has a main hoisting system comprising at least one main hoisting winch, an associated main hoisting cable and a load connector, e.g. a hook, the main hoisting cable extending from the main hoisting winch to a main hoist cable guide on the boom and then to the load connector.

In an embodiment, the installation crane is configured to carry out:
- in a first slewing position thereof, a hoisting operation during an assembly step of the wind turbine performed at a portside mast-receiving well,
- in a second slewing position thereof, a hoisting operation during an assembly step of the wind turbine performed at a starboard-side mast-receiving well, and
- a hoisting of an assembled wind turbine out of the portside or the starboard side mast-receiving well, and then a slewing operation to an installation slew position wherein the wind turbine is clear of the deckbox structure at the bow side or stern side where the installation crane is located and over a foundation onto which the wind turbine is to be installed, followed by a lowering of the wind turbine onto the foundation.

In an embodiment, the installation crane and/or the hoisting system thereof comprises a heave compensation device that is adapted to compensate for sea-state induced heave motion of the wind turbine mast relative to a mast mounting structure of the foundation, e.g. floating foundation, on which the wind turbine is to be installed.

The first aspect of the present invention also provides a method for assembling a wind turbine and for installation of the assembled wind turbine on a foundation, e.g. a sea-bed mounted foundation or a floating foundation, wherein use is made of a semi-submersible crane vessel, wherein the vessel comprises:
- a floating hull with:
  - a deckbox structure;
  - two parallel pontoons,
  - a row of support columns extending upward from each of the two pontoons, the support columns supporting thereon the deckbox structure;
- wherein the deckbox structure has a deck and a box bottom,
- an installation crane mounted on the deckbox structure and configured to install the assembled wind turbine on the foundation,
- wherein, at an assembly station, the hull of the vessel is provided with a mast-receiving well that is sunk into, or through, the hull, preferably a well that extends into, or through a support column of the hull, which well is configured to receive therein at least a portion of the mast of the wind turbine, wherein the assembled wind turbine to be installed comprises at least a part of a wind turbine mast and a rotor assembly that is mounted on the mast, e.g. a nacelle having a hub, which rotor assembly is, optionally, provided with one or more, e.g. all, of the rotor blades, in which method, during an assembly step of the wind turbine, e.g. during mounting of the rotor assembly on the mast and/or during assembly of one or more, e.g. all, of the rotor blades to the rotor assembly, the mast is arranged at least with a portion thereof in the mast-receiving well.

The first aspect of the invention is based on the insight that a semi-submersible vessel is well-suited to be provided with a mast-receiving well that is sunk into, or even through, the hull, which well is configured to receive therein at least a portion of the mast of the wind turbine in the course of the assembly of the wind turbine.

In a preferred embodiment, the mast-receiving well extends into a support column, optionally even into the pontoon. The well preferably has a floor configured for the mast to stand thereon, e.g. the floor being integrated with the pontoon and/or with a lower section of the support column.

It will be appreciated that the mast-receiving well can be retrofitted in existing semi-submersible vessels.

Preferably, the mast-receiving well is arranged with reach of the installation crane, thereby allowing for use of the crane to place the mast, or part thereof in the well and to later remove the assembled, or partly assembled wind turbine from the well, the wind turbine then being placed by the crane on the foundation.

For example, the installation crane is mounted directly above a support column at the end of a row of columns, so practically at a corner of the deckbox structure, and the mast-receiving well is provided in the adjacent support column of the same row of columns on the pontoon.

In another embodiment, e.g. when the vessel has one installation crane at one corner of the deckbox structure above a support column at the end of a row of columns on the one pontoon, the mast-receiving well is arranged into or through a support corner at the end of the row of columns on the other pontoon, e.g. the crane and the well both being located at the stern of the vessel, each, for example, practically at a corner of the deckbox structure.

In embodiments, as known in the art, the vessel has two, possible identical, cranes, each fitted at a corresponding corner, e.g. at the stern, of the of the deckbox structure.

In an embodiment, the installation crane is mounted directly above a support column at the end of a row of columns, and the vessel has one mast-receiving well which is provided in the adjacent support column of the same row of columns on the pontoon.

In an embodiment, the semi-submersible vessel has a portside pontoon and a starboard-side pontoon, wherein the installation crane has a crane structure base that is fixed on a part of the deckbox structure that extends between a portside support column and a starboard side support column, at one of the bow side and stern side of the deckbox structure, and wherein a portside mast-receiving well extends in the portside support column and a starboard side mast-receiving well extends in the starboard-side support column, wherein the installation crane has a slewable superstructure that is supported on the crane structure base via a slew bearing allowing to revolve the superstructure, preferably over 360 degrees, about a vertical slew axis, wherein the superstructure is provided with a boom, and wherein the crane has a main hoisting system comprising at least one main hoisting winch, an associated main hoisting cable and a load connector, e.g. a hook, the main hoisting cable extending from the main hoisting winch to a main hoist cable guide on the boom and then to the load connector, wherein the installation crane is configured to carry out:

in a first slewing position thereof, a hoisting operation during an assembly step of the wind turbine performed at the portside mast-receiving well, in a second slewing position thereof, a hoisting operation during an assembly step of the wind turbine performed at the starboard-side mast-receiving well, and a hoisting of an assembled wind turbine out of the portside or the starboard side mast-receiving well, and then a slewing operation to a third slewing position, also called installation position, wherein the wind turbine is clear of the deckbox structure at the bow side or stern side where the installation crane is located and over a foundation onto which the wind turbine is to be installed, followed by a lowering of the wind turbine onto the foundation.

In embodiments, a further slewing position, e.g. a fourth slewing position between the first and second slewing positions, e.g. at the aft side of the installation crane, corresponds to a further station involved in assembly of the wind turbine. For example, with the crane in this position over the deck of the vessel, the main hoisting system thereof can be used for upending the mast or a mast part of the mast. For example, the mast is composed of two or three mast parts. Herein, the mast part can be upended and lifted, and by slewing the installation crane positioned over a mast part already placed in a well. The further slewing position can also be used for lifting the nacelle which is to be installed on a mast.

For example, wind turbine mast parts that are stored on the deck horizontally can skid transversely, e.g. from the two sides of the deck, to centerline. For example, at a centerline of the deck the mast part will be upended using the installation crane. For example, a movable upending bucket can travel over the deck to support the lower end of the mast part, e.g. from the aft side of the deck to an auxiliary side of the installation crane opposite the forward-facing installation side of the crane.

In an embodiment, the superstructure comprises a rigid and vertically extending crane structure top section that is supported on the crane structure base via the slew bearing, wherein the boom is mounted to the crane structure top section, e.g. to a top thereof, so as to revolve along with the crane structure top section, wherein, preferably, the top section is formed by lattice work.

Preferably, the vertically extending crane top section extends at least 50 meters or more above the deck of the deckbox structure of the vessel.

Preferably, the boom is connected to the top of the vertically extending crane top section, preferably pivotally connected for pivoting about a horizontal pivot axis by means of a luffing mechanism.

For example, the well has a depth of at least 15 meters, e.g. at least 30 meters, measured from the deck of the deckbox structure. For example, the well has a depth over 40 meters, which is, for example, possible within a vessel like the recently launched Sleipnir vessel as the overall height there is about 50 meters.

For example, an embodiment of the well having a depth of at least 30 meters, e.g. over 40 meters, allows for receiving a significant portion of the entire mast of a wind turbine in the well, e.g. as mast heights may vary between 75 and 110 meters in practical embodiments.

Due to the placement in the well, the top of the mast is closer to the deck, which facilitates operations like mounting the nacelle on the mast top, mounting one or more, e.g. all, blades to the nacelle, etc.

In view of the height of the mast, and the advantages of having the top end relatively close to the deck for performing some assembly steps, e.g. mounting the nacelle and/or mounting one or more, e.g. all, blades, it is envisaged that in embodiments the well extends through the hull, e.g. through a support column and the further down through the pontoon. In the latter version the well resembles a moonpool or shaft entirely through the hull, e.g. allowing for operations wherein the mast sticks out below the bottom of the pontoon of the vessel. In such an open bottomed well, the mast or part thereof can be suspended, e.g. by means of winch driven cables, e.g. said cables engaging on the lower end of the mast.

An open bottomed well may allow for arranging, e.g. suspending, the mast (or mast part) therein such that the top thereof is in proximity of the deck. For example, this allows for the nacelle to be moved substantially horizontally over the deck, e.g. by one or more vehicles or by a cart, e.g. over rails mounted on deck, e.g. skidded by a skid cart, in order for the nacelle to be positioned over the mast top end and connected thereto. For example, the mast is then lifted over part of its height to a height that is suited for mounting one or more blades to the nacelle.

The above-described operation could in combination with a closed bottom well, so one that does extend into the hull yet not through the hull, also be carried out when use is made of a two-part mast for the wind turbine. Herein the upper part of the mast is placed in the well and the nacelle mounted then on top thereof.

In embodiments, the installation crane is provided with at least one mast engaging device having a mast engagement member as well as an actively controlled motion mechanism that is configured and may be operated to provide a controlled motion of the mast engagement member in a horizontal plane so as to bring and maintain the mast of the suspended wind turbine in one or more desired positions and/or tilted orientations, e.g. into alignment with the mounting axis of the foundation.

For example, the installation crane has an upper mast engaging device as well as a lower mast engaging device, each having a mast engagement member as well as an actively controlled motion mechanism that is configured and operated to provide a controlled motion of the mast engagement member in a horizontal plane. These mast engaging devices act on the mast at different heights, e.g. the lower one below the center of gravity of the wind turbine to be installed and the upper one above said center of gravity.

For example, the one or more mast engaging devices may be employed to stabilize the—partly assembled or fully assembled—wind turbine during slewing of the crane, when the engagement device is mounted on the slewable top section or mounted, e.g. the lower device, on another carrier that follows the slewing motion, e.g. a carrier on a (semi)-circular track, e.g. on the crane base structure and/or the deck.

In an embodiment, the combination of a heave compensated main hoisting system of the installation crane, with the upper mast engaging device as well as lower mast engaging devices equipped with an actively controlled motion mechanisms, allows for compensating motions of the entire wind turbine suspended from the crane in all six degrees of freedom.

For example, wind turbine hoist tackles in the installation crane are equipped with active heave compensation systems to compensate for the vertical motion of the vessel.

For example, the installation crane is capable to install wind turbines up to about Hsig=3.5 m dependent on the wave period.

In embodiments, in addition to the one or more mast engaging devices, the vessel is, preferably, equipped with a restraining device that acts as a restraint between the vessel and the foundation, e.g. at least in the horizontal X-Y plane relative to the vessel, e.g. the floating foundation.

Preferably, this restraining device is embodied generally similar to the one or more mast engagement devices. This restraining device is, preferably, mounted on a trolley that is vertically mobile, e.g. along vertical rails mounted on the hull of the vessel, e.g. said rails being inline with rails for mast engagement devices.

As for the mast engagement devices, the restraint device has a foundation engagement device, e.g. a clamp as shown in the figures that clamps about a portion of the foundation, and an actively controlled motion mechanism between the trolley and the foundation engagement device, e.g. of similar design with orthogonal tracks as well.

In a less preferred design, a system of lines is used as restraint.

In operation, the mast engagement devices—providing actively controlled longitudinal and transverse compensation—allow to eliminate or reduce significantly the x- and y-motions as follows from roll, pitch, yaw, surge and sway. The restraint device is used to grip to the wind turbine foundation.

Control systems to achieve compensation may be fed by a motion reference unit and, optionally, a wave radar for the actual and the prediction of relative motions.

In embodiments, the vessel is also used for transportation and/or installation of foundations, e.g. monopiles or jackets. For example, the installation crane is used for upending the monopile. For example, one or more monopiles can be stored vertically within reach of the installation crane. For example, one or more monopiles are stored horizontally on the deck.

In embodiments, the vessel has a monopile gripper for installation of the monopile. For example, the restraint device described herein also is operable as X-Y compensated monopile gripper.

A second aspect of the present invention relates to the installation and, possibly, de-installation of blades for a wind turbine having a horizontal axis rotational hub that is arranged on top of a mast of the wind turbine.

Both onshore and offshore, it is known to install the blades onto the hub with the nacelle at an operational height on top of the full-height mast.

In one known blade installation approach the horizontal axis rotational hub is oriented so that the blade mounting structure of the hub to which a blade is to be fastened is arranged in a three-o'clock or nine-o'clock position or thereabout, so generally facing sideways. A wind turbine blade is then picked up and lifted in a horizontal orientation and brought in horizontal general alignment with the sideways facing blade mounting structure. Lifting is commonly done by one or more cranes, with a gripper assembly engaging the wind turbine blade near its center of gravity. For example, the gripper comprises one or more slings that have been slung around the wind turbine blade.

Another known approach is the six-o'clock installation of the wind turbine blade. Herein the horizontal axis rotational hub is oriented so that the relevant blade mounting structure of the hub is arranged in downwards direction, called the six-o'clock position. A blade is then lifted and brought in vertical general alignment with the downwards facing blade mounting structure. Lifting is commonly done by one or more cranes or with a winch arrangement on the nacelle.

A horizontal axis rotational hub of a sizable wind turbine, e.g. a several megawatts wind turbine, commonly has three blade mounting structures. Each blade mounting structure commonly includes a bearing allowing for variation of the pitch angle of the blade. The bearing commonly has a ring, e.g. an outer ring, attached to a hub body and a ring, e.g. an inner ring, to be attached to the root end of the blade.

In the industry a bolted connection between the root end of the blade and the blade mounting structure, e.g. the inner ring of the bearing, is the common standard. The bolted connection commonly involves a circular array of longitudinal bolts extending from a stern face of the root end of the blade, with the blade mounting structure having a corresponding array of bolt holes in which the longitudinal bolts are to be received. A nut is then commonly tightened on each bolt. Introducing the multitude of bolts simultaneously into the bolt holes requires an accurate alignment of the wind turbine blade relative to the blade mounting structure, which is challenging due to the size and weight of the rotor blade, wind effects, etc.

In the wind industry, floating foundations are seen as most promising for the future demand of wind generated electrical power. Herein the installation and/or de-installation of blades is complex to be performed at the offshore location.

The present invention aims to provide measures that allow for improved installation of a wind turbine blade on the hub of a nacelle that is arranged on top of a mast, or at least upper part of the mast, of a wind turbine.

The invention provides according to a second aspect thereof a blade handling system according to claim 12.

In practice, an operating height of the nacelle may be 1.5-2.5 times the length of a blade. Hence, for a blade of 50 meters, the length of the mast is 75-125 meters. A prior art blade handling apparatus thus has to lift the root end of the blade to this operating height.

According to an embodiment of the second aspect of the invention, the nacelle is provided at an installation height corresponding to 50-60% of the length of a blade. The effect is that the blade handling apparatus only has to lift the root end of the blade to this reduced installation height, which simplifies the installation.

The installation height of the nacelle corresponding to 50-60% of the length of a blade can in embodiments be achieved in that the at least part of a mast is an upper part of a mast, the upper part being configured to be mounted onto a lower part of the mast at a later stage. For example, the lower part of the mast is already mounted on, or part of, the foundation of the offshore wind turbine, e.g. of the floating foundation.

In embodiments, the installation height of the nacelle corresponding to 50-60% of the length of a blade is achieved in that a support of the at least upper part of a mast is entrenched or sunk with respect to the horizontal supply position of the blade. Depending on the depth of the trench or well, the at least upper part of a mast may have a length exceeding that of the blade and e.g. have an operational length of e.g. 1.5-2.5 times the length of a blade, e.g. corresponding to a full-height mast of the wind turbine.

The blade handling system of the invention allows to assemble a wind turbine pre-assembly of at least part of a mast, a nacelle and blades. This wind turbine pre-assembly may be transported to onshore and/or offshore locations.

In embodiments, the system of the second aspect is land based.

In other embodiments, the system of the second aspect is mounted on-board a vessel, e.g. the vessel having an installation crane configured to handle the assembled wind turbine and place it on the foundation, e.g. according to the first aspect.

In an embodiment, the vessel of the second aspect is semi-submersible crane vessel for use in assembling a wind turbine and for installation by means of a crane of the vessel of the assembled wind turbine on a foundation, e.g. a sea-bed mounted foundation or a floating foundation. For example, the vessel comprises:
  a floating hull with:
    a deckbox structure,
    two parallel pontoons,
    a row of support columns extending upward from each of the two pontoons, the support columns supporting thereon the deckbox structure,
  wherein the deckbox structure has a deck and a box bottom,
  an installation crane mounted on the deckbox structure and configured to install the assembled wind turbine on the foundation, e.g. a tub mounted crane, e.g. a crane mounted above a support column at the end of a row of columns.

In an embodiment, at an assembly station, the hull of the (semi-submersible) vessel is provided with the mast-receiving well that is sunk into, or through, the hull, preferably a well that extends into, or through a support column of the hull, which well is configured to receive therein at least a portion of the mast of the wind turbine during an assembly step of the wind turbine, e.g. during mounting of the rotor assembly on the mast and/or during assembly of one or more, e.g. all, of the rotor blades to the rotor assembly.

In an embodiment, the boom structure comprises a pivotal boom to which the one or more blade grippers are attached, which boom is pivotal with respect to the base in a boom pivot direction about a horizontal boom pivot axis between a lowered position for gripping a blade in the horizontal supply position and a raised position in which the blade has said tilted or horizontal fastening orientation.

In an embodiment, the boom structure comprises an articulated boom structure comprising a first boom member and a second boom member that is pivotal relative to the first boom member, wherein the one or more blade grippers are attached to the second boom member, wherein the first boom member is pivotal with respect to the base in a boom pivot direction about a horizontal boom pivot axis, and wherein the articulated boom structure is movable between a lowered position for gripping a blade in the horizontal supply position and a raised position in which the blade has said tilted or horizontal fastening orientation.

In an embodiment, the base is located in proximity of a support for the at least upper part of the mast, e.g. of the mast-receiving well, and wherein the boom structure is movable in a plane through the blade mounting positions of the hub of the wind turbine, e.g. the boom pivot axis being located closer to the base than the root end of the blade in the supply position and the boom being pivotal upward to the tilted orientation of the blade, e.g. a single blade gripper being mounted on the boom and pivotal about a horizontal axis relative to the boom.

The second aspect of the invention also relates to a method for installation and/or de-installation of a blade, e.g. all blades, of a wind turbine, said wind turbine having a nacelle with a horizontal rotational hub provided with blade mounting structures, e.g. three blade mounting structures spaced by 120°, the nacelle being supported on at least an upper part of a mast of the wind turbine, wherein each blade has a tip end, a root end, and a length, wherein use is made of a blade handling system or blade handling apparatus as described herein.

In an embodiment, the method comprises installation of at least two blades on the hub:
  positioning a first blade mounting structure of the hub in alignment with the tilted or horizontal orientation associated with the fastening position of the blade,
  supplying by means of the blade supply system a first blade into the horizontal supply position;
  transferring by means of the blade handling apparatus the first blade into the fastening position relative to the first blade mounting structure;
  fastening the root end of the first blade to the first blade mounting structure;
  disengaging the blade gripper from the blade and bringing the blade handling apparatus to the horizontal supply position;
  rotating the hub to position a second blade mounting structure in alignment with the tilted or horizontal orientation associated with the fastening position of the blade,
  supplying by means of the blade supply system a second blade into the horizontal supply position;
  transferring by means of the blade handling apparatus the second blade into the fastening position relative to the second blade mounting structure;
  fastening the root end of the second blade to the second blade mounting structure,
  disengaging the blade gripper from the second blade and bringing the blade handling apparatus to the horizontal supply position.

In an embodiment of the above method, the horizontal rotational hub is provided with blade mounting structures spaced by 120° and wherein the method comprises:
  supplying by means of the blade supply system a third blade into the horizontal supply position;
  transferring by means of the blade handling apparatus the third blade into the fastening position relative to the second blade mounting structure;
  fastening the root end of the third blade to the third blade mounting structure,
  disengaging the blade gripper from the third blade and bringing the blade handling apparatus to the horizontal supply position.

In an embodiment of the above method, the tilted fastening orientation, preferably for each blade to be installed or de-installed using the blade handling apparatus, corresponds to about the four-o'clock or to about the eight-o'clock position, seen in front view onto the nacelle, e.g. wherein the blade includes 30-40° with the horizontal.

In an embodiment of the above method, the system comprises a mast-receiving well or trench in proximity to the blade handling apparatus, which well or trench is configured to receive therein a portion of the mast, e.g. at least 10 meters, e.g. at least 30 meters of the length of the mast, e.g. said mast being a full-height mast to be installed on an offshore foundation (2000), wherein the blade handling apparatus is operated to install and/or de-install the blades of the wind turbine with the mast sunk partially into the well.

In an embodiment of the above method, the mast of the wind turbine comprises an upper part and a lower part, the upper part supporting the nacelle during the installation and/or de-installation of the one or more blades, and wherein a connector is provided that is configured to allow for mounting the upper part of the mast together with the nacelle and the blades installed on the hub onto the lower part, e.g. allowing for a releasable connection between the upper part and the lower part of the mast.

The present invention also relates to a method for installation of an offshore wind turbine, wherein the wind turbine is assembled using the method as above. For example, the blade handling system is land-based, and the blades are installed using the blade handling system on land, and wherein the wind turbine having at least, or just, the upper part of the mast, the nacelle and all blades is conveyed to an offshore installation site, e.g. where a soil-bound or floating foundation is located and where the wind turbine is mounted on the foundation.

In an embodiment, the foundation is provided with a lower part of the mast and the on-land assembled wind turbine is provided with the upper part of the mast, said wind turbine being mounted on the lower part of the mast at the offshore installation site.

The present invention also relates to a production location for wind turbine pre-assemblies, each pre-assembly having at least an upper part of a mast, a nacelle with a horizontal axis hub and blades mounted to the hub, the production location being provided with a blade handling system or blade handling device as described herein and/or performing a method, or part thereof, as described herein.

The invention also relates to a blade handling apparatus as described herein.

The invention also relates to a method for installing blades for a wind turbine as described herein.

The invention also relates to a production location for wind turbine pre-assemblies of at least part of a mast, a nacelle and blades as described herein.

The invention also relates to an installation crane as described herein.

The invention also relates to a semi-submersible vessel hull as disclosed herein, e.g. fitted with one or more mast-receiving wells as disclosed herein.

The invention is further elucidated in relation to the drawings.

Figure 2B:
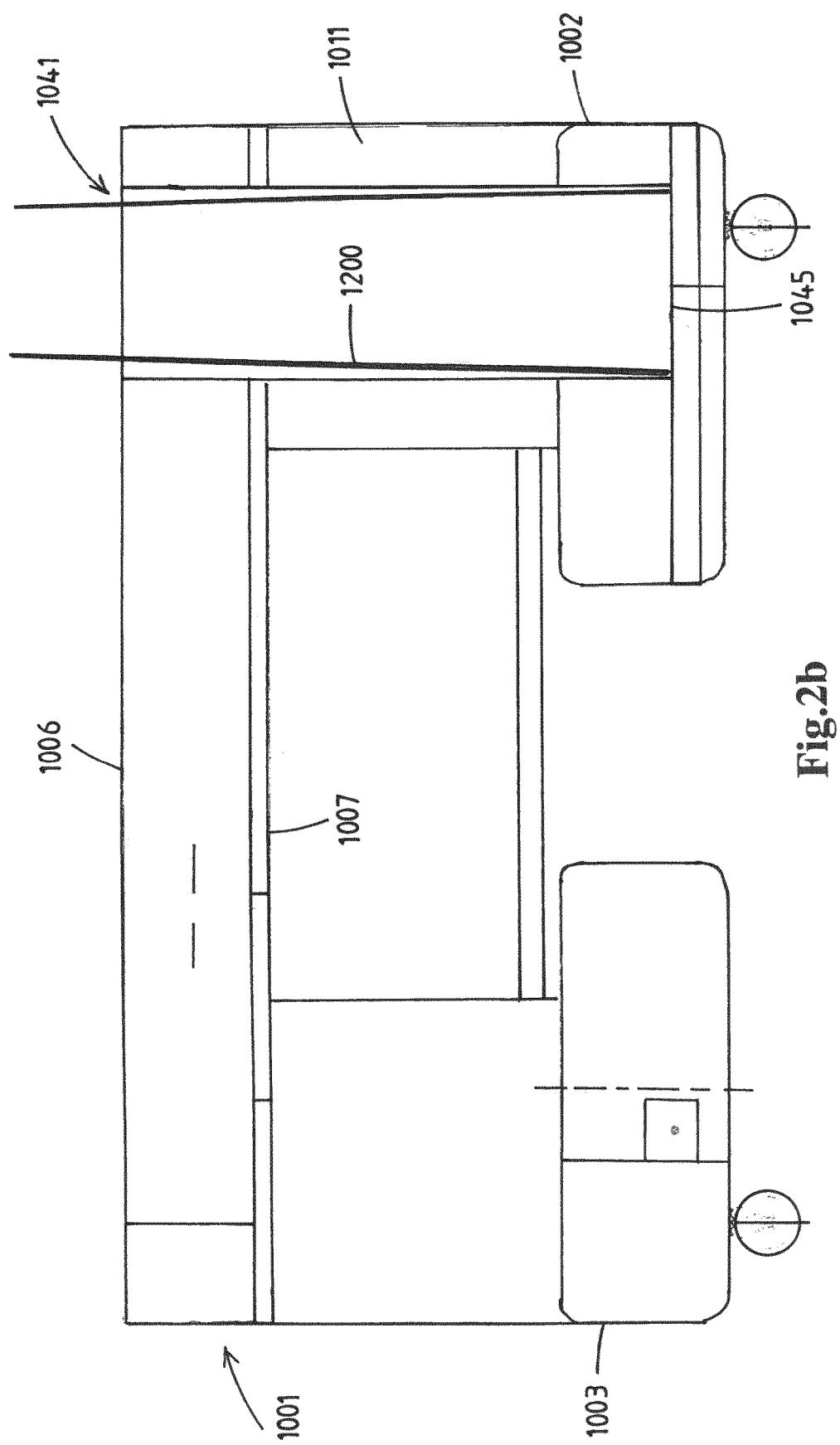
Figure 2C:
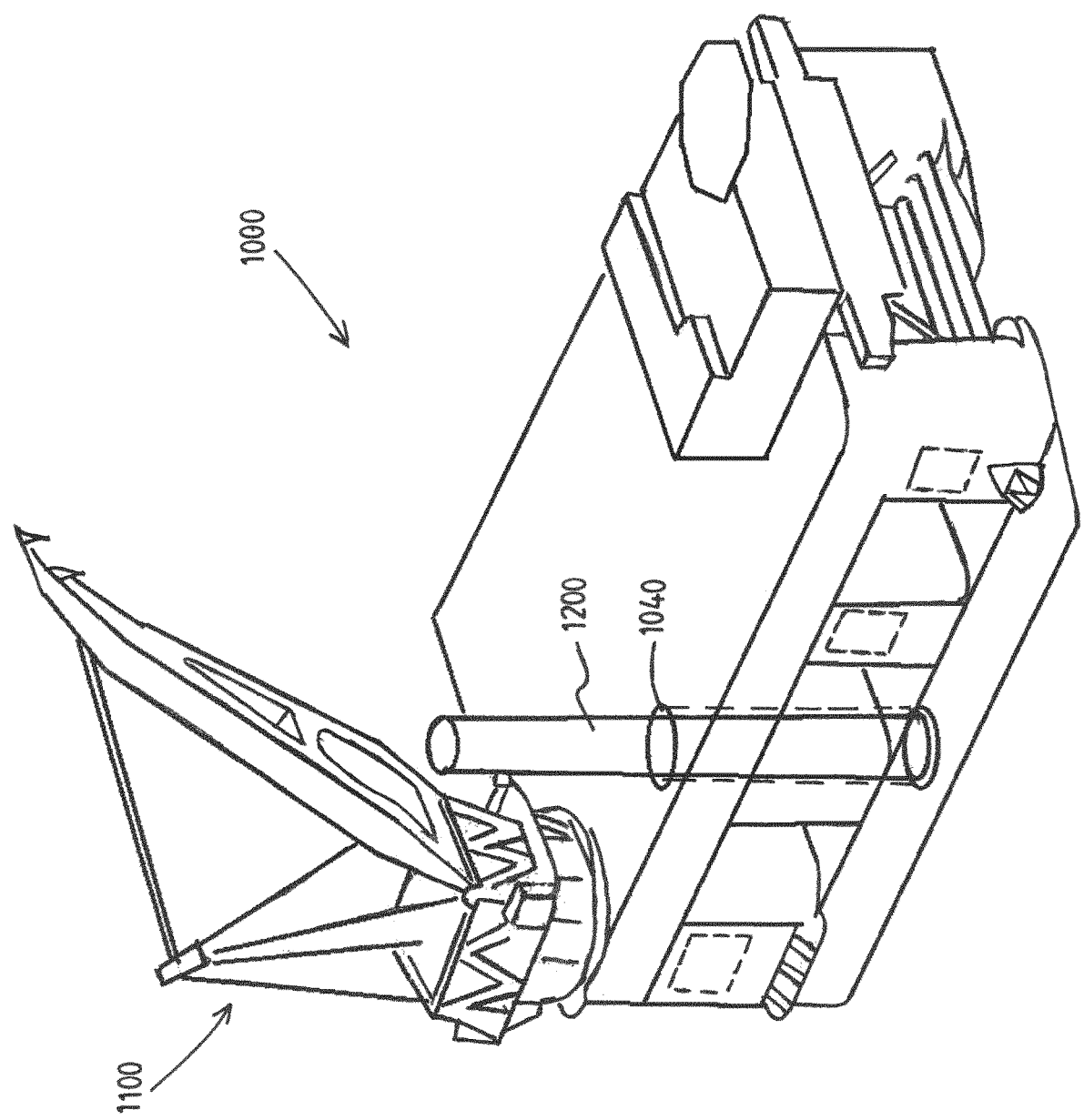
Figure 2E:
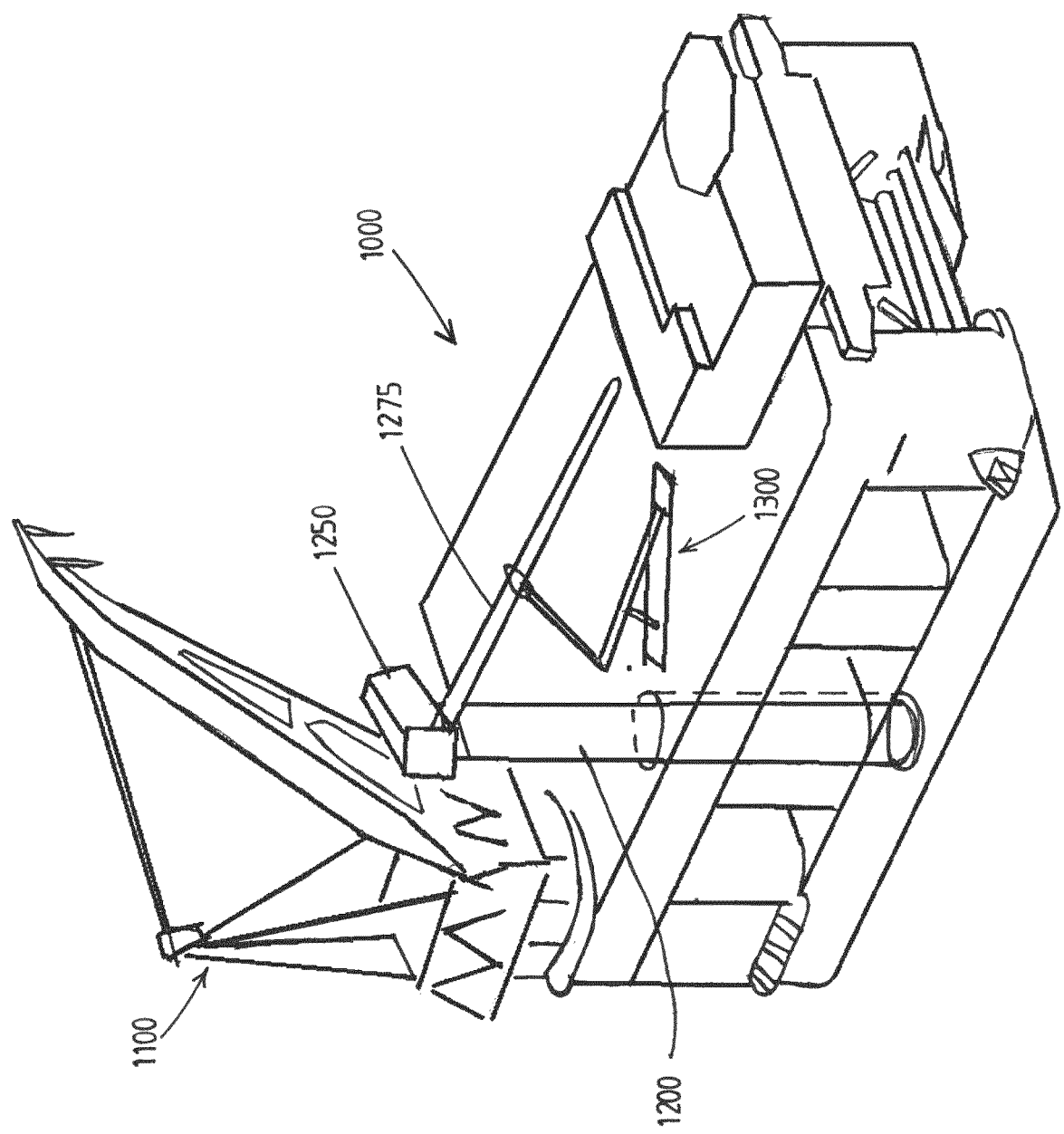
Figure 2F:
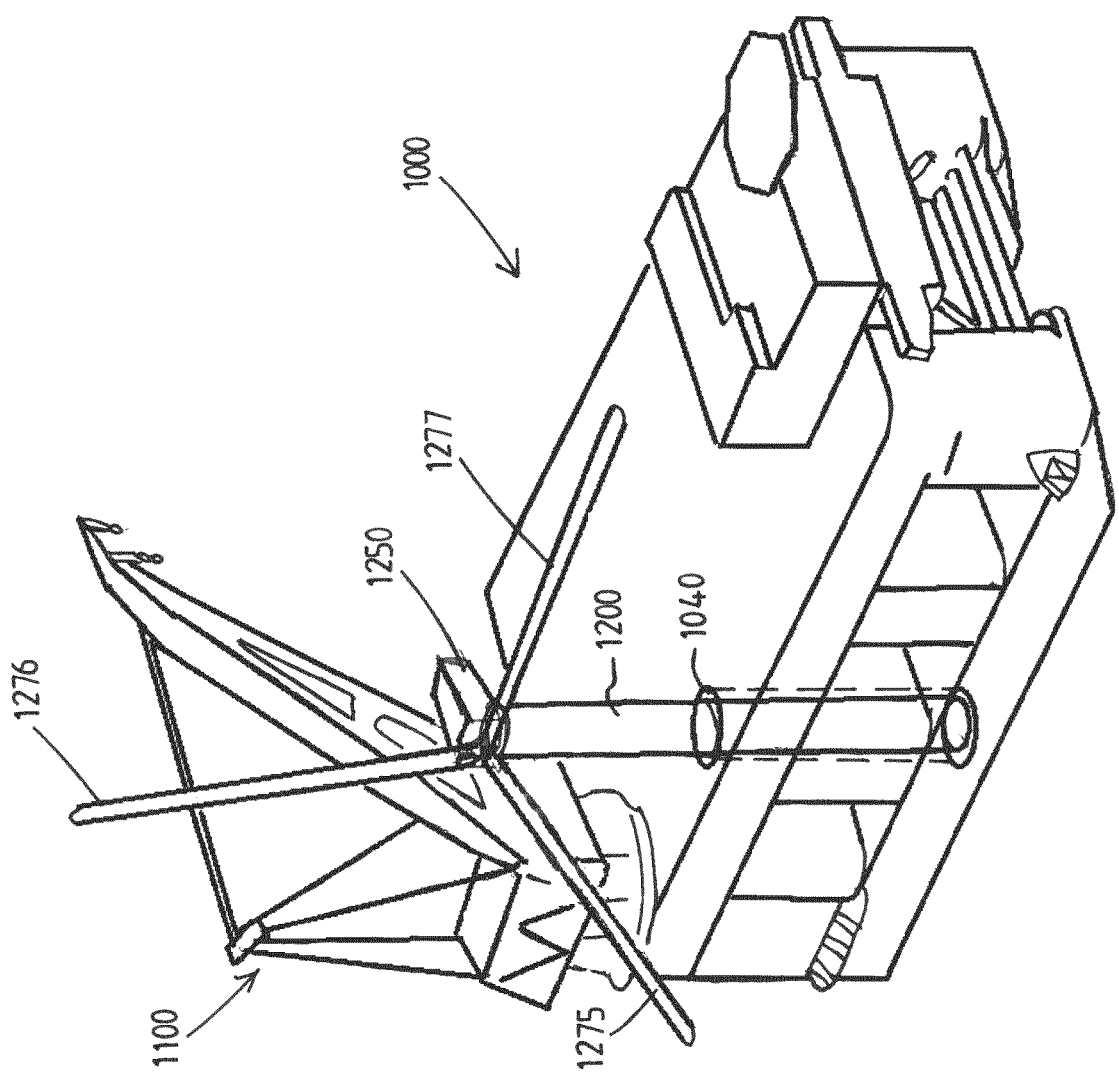
Figure 3:
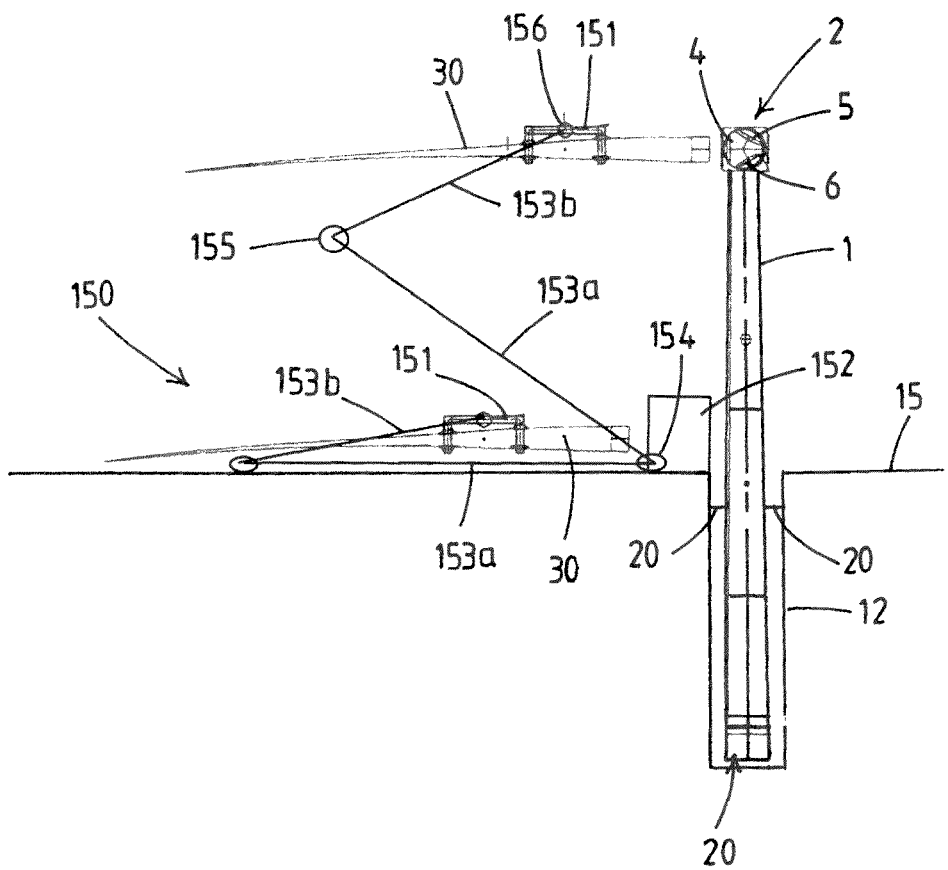
Figure 4:
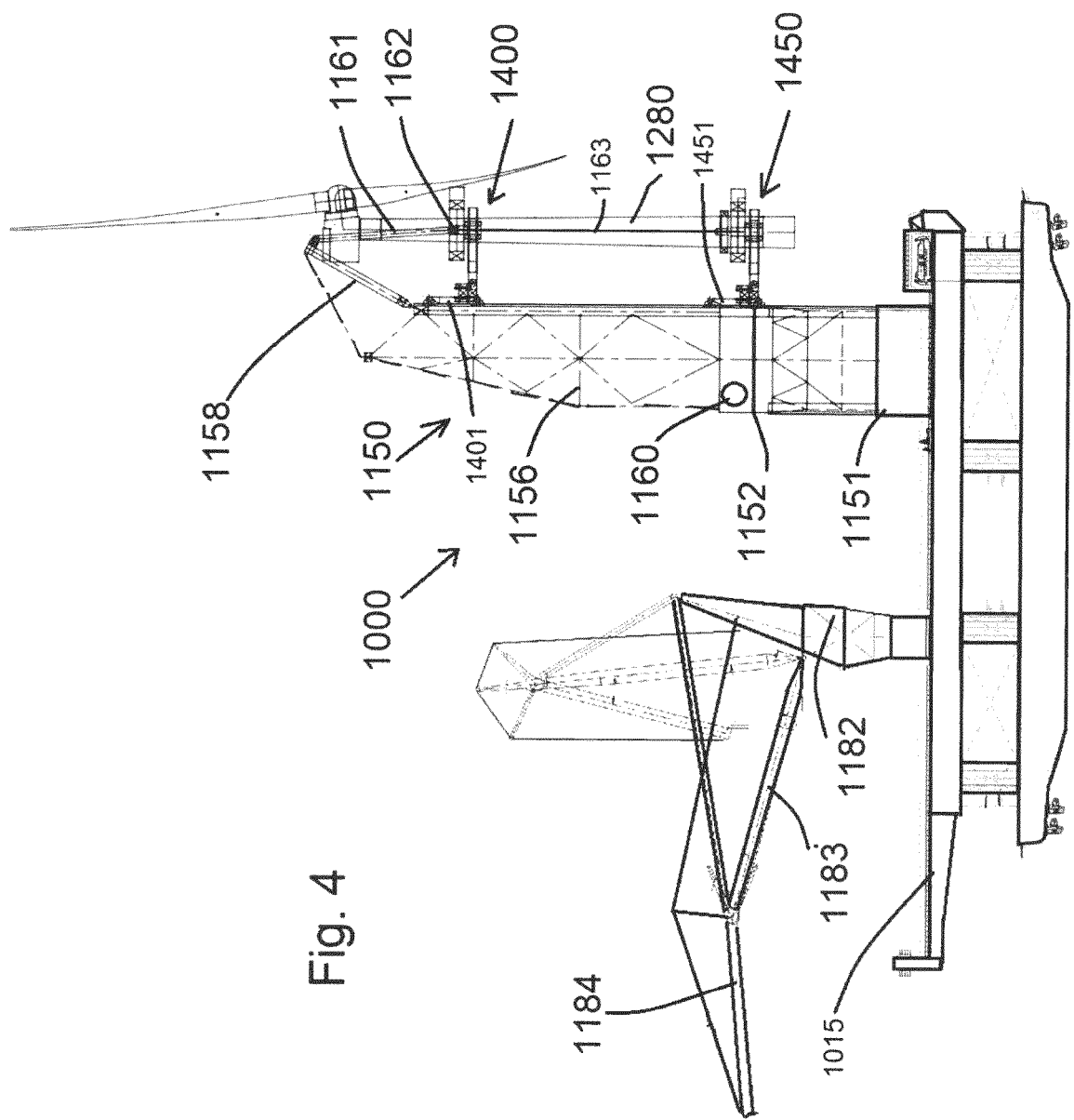
Figure 5:
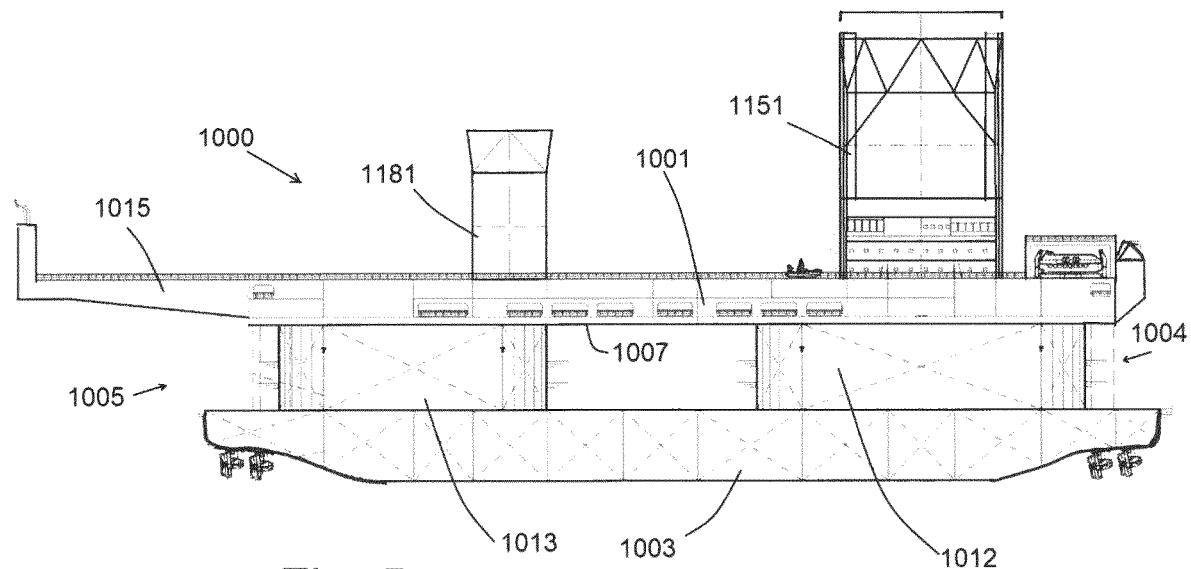
Figure 6:
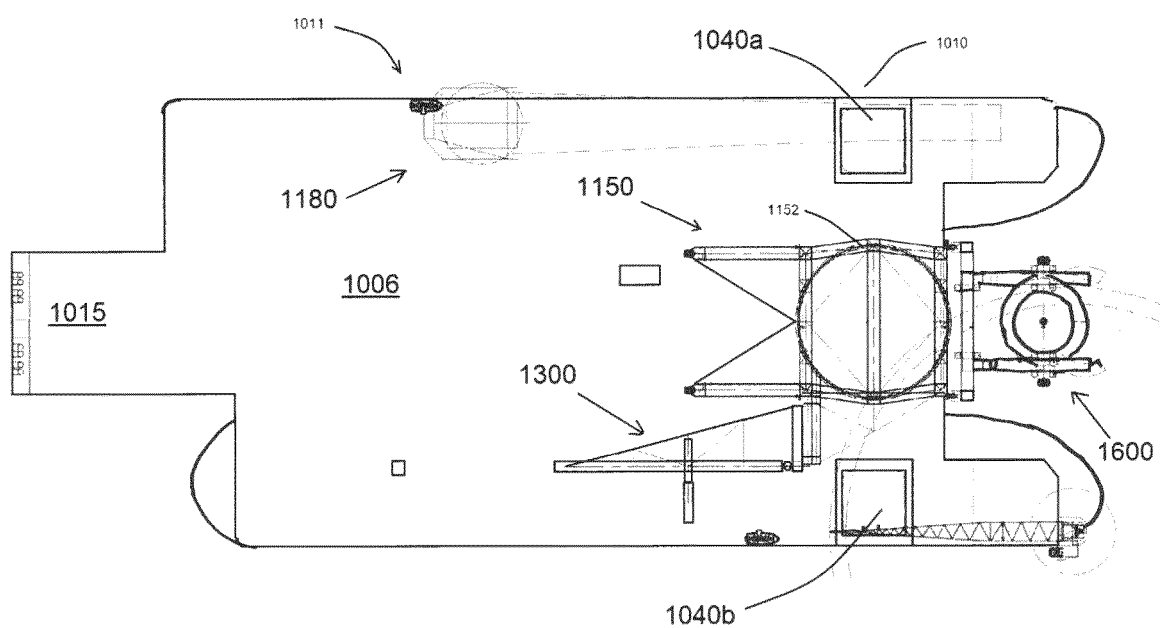
Figure 7:
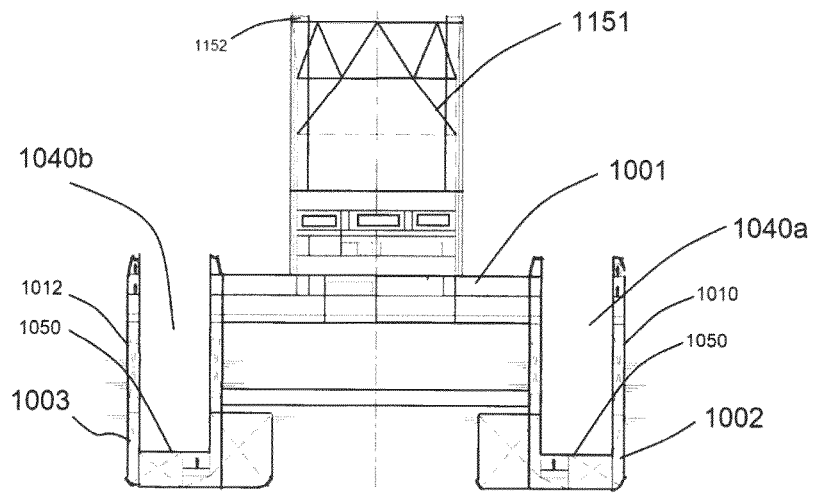
Figure 8:
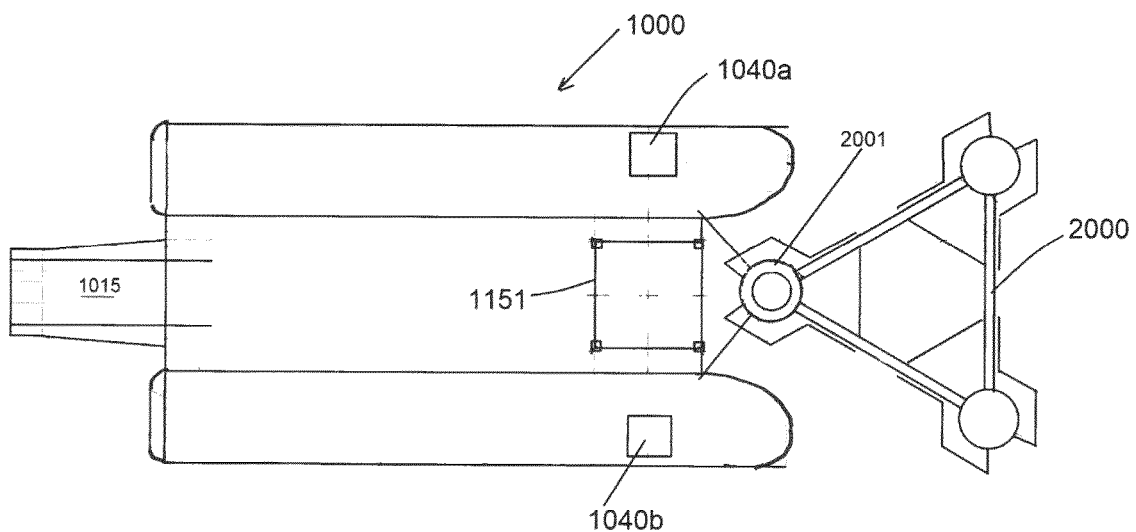
Figure 9:
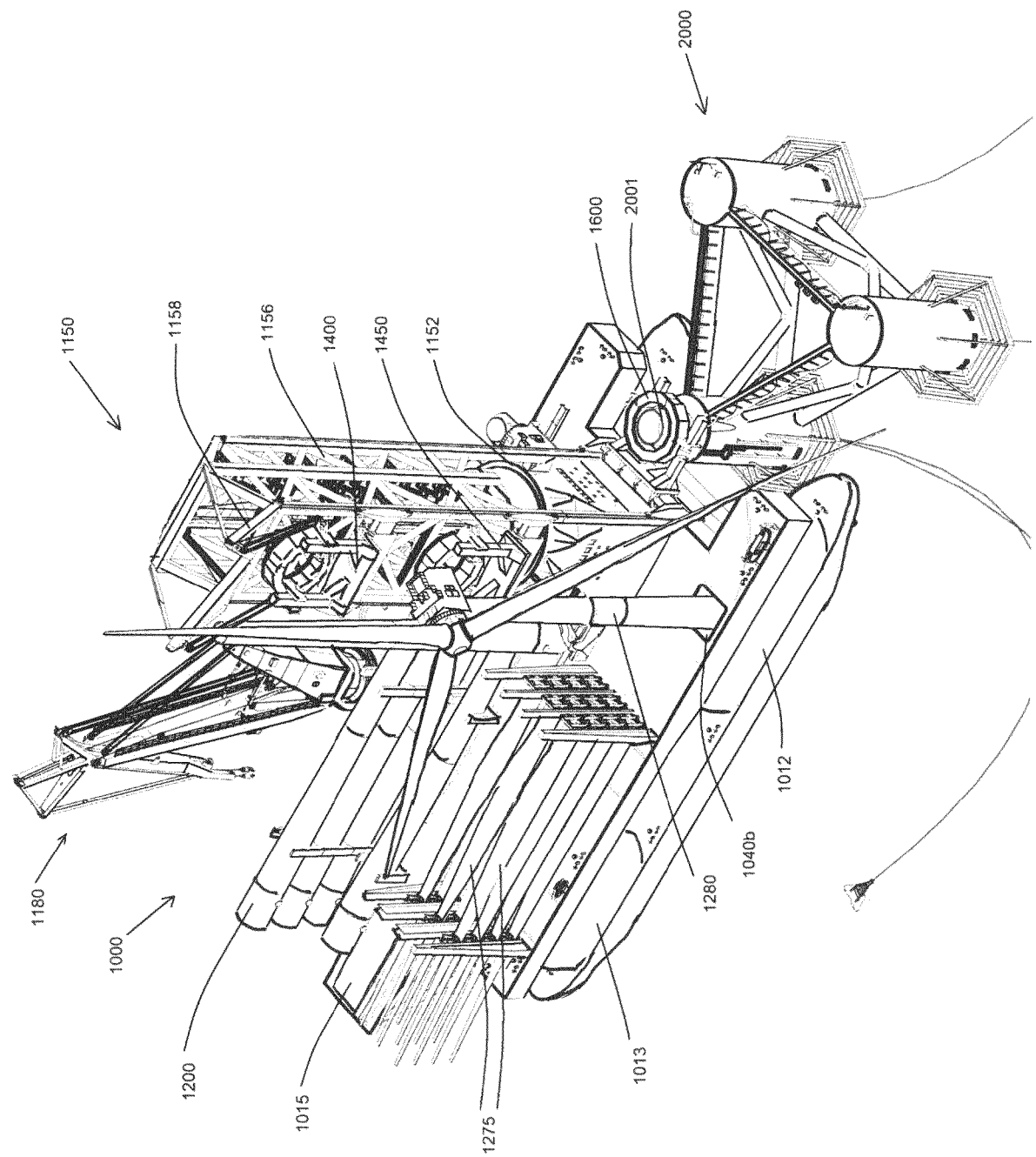
Figure 10:
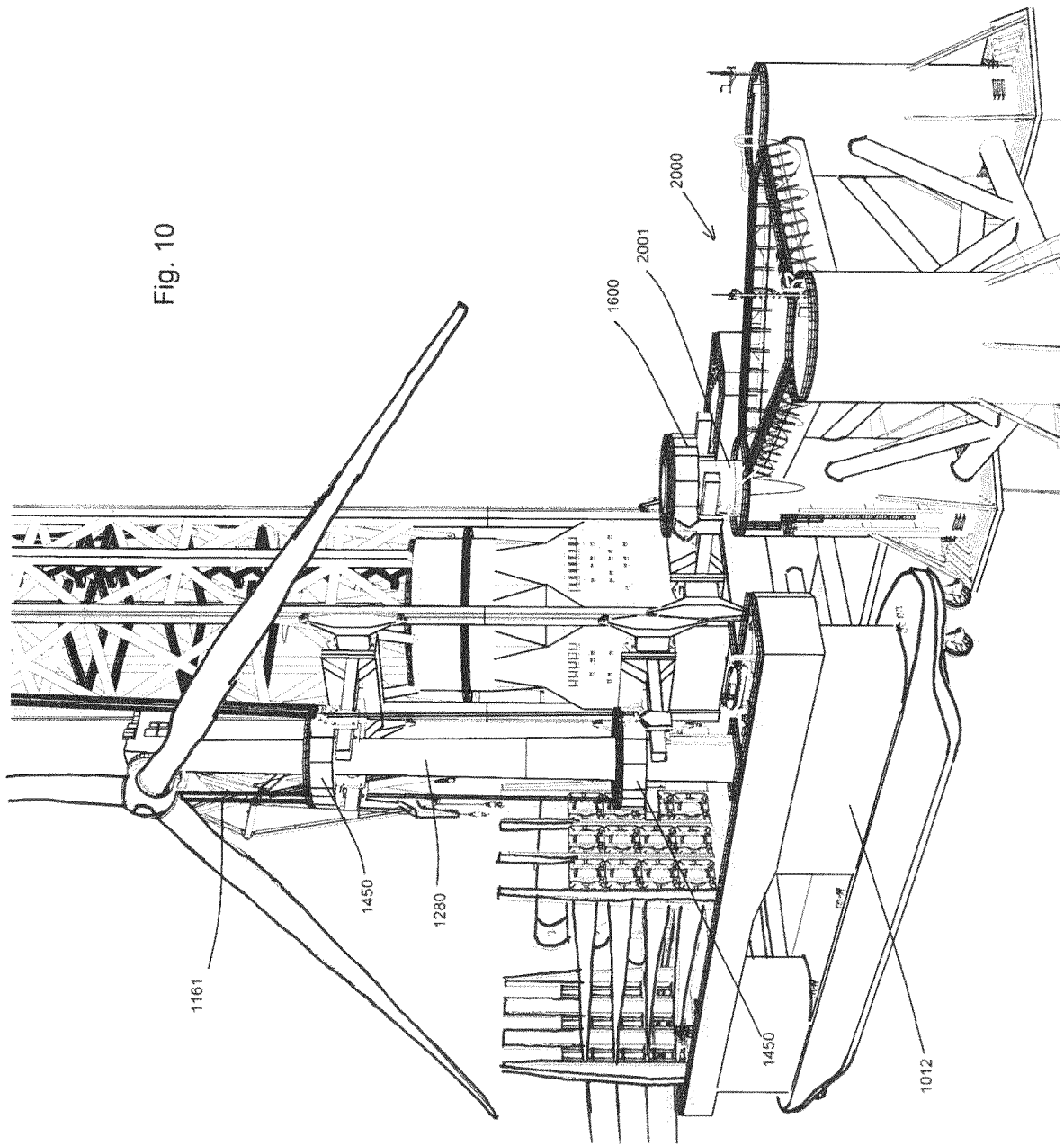
Figure 11:
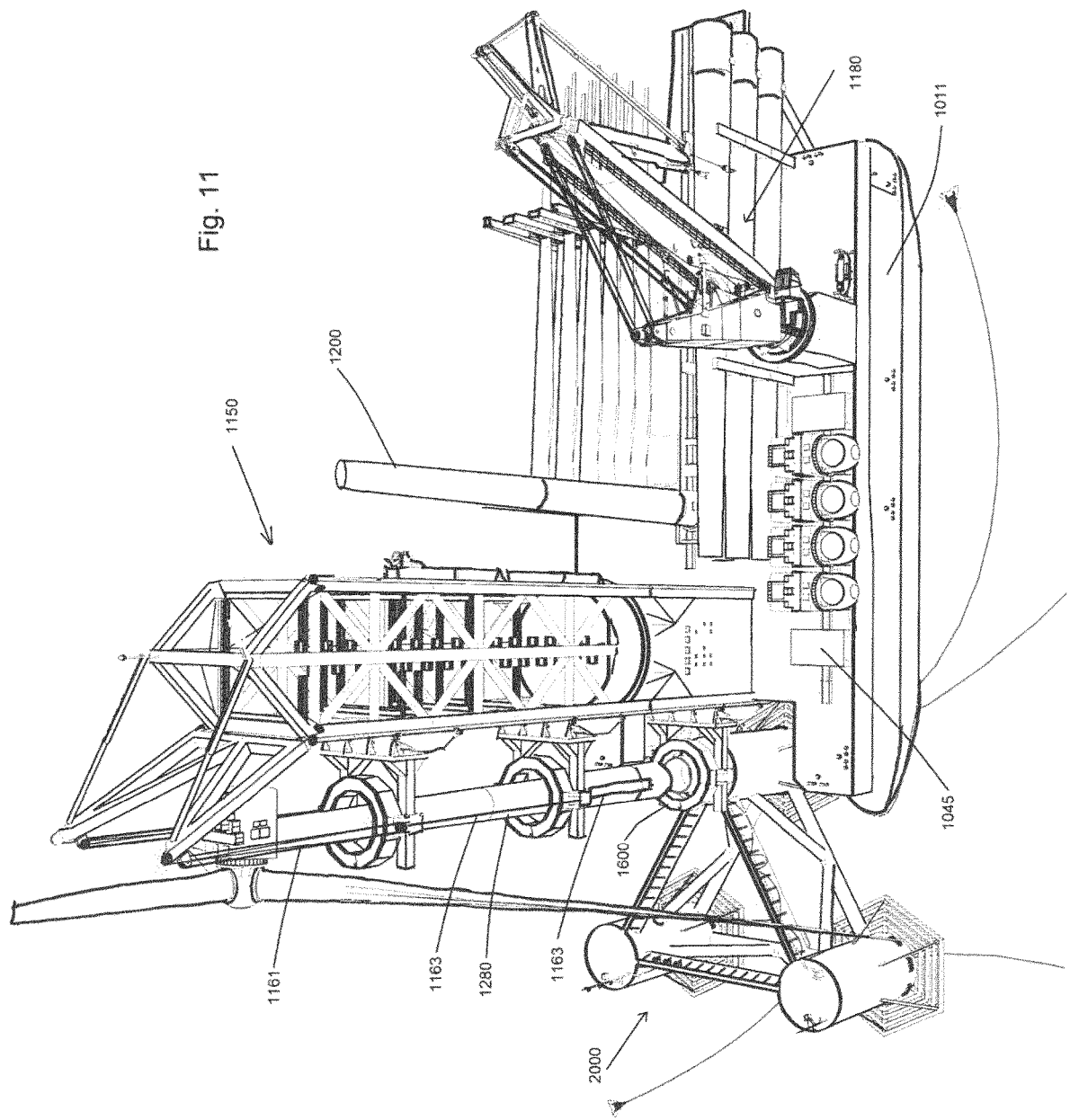

In the drawings:

FIG. 1a illustrates the placing of a full-height wind turbine mast with nacelle thereon into a well or trench of an on-land production location according to the invention, FIG. 1b illustrates the installation of a first blade onto the hub using the blade handling system and apparatus according to the second aspect of the invention, FIG. 1c illustrates the rotation of the hub after installation of the first blade, followed by the installation of the second blade, FIG. 1d illustrates the rotation of the hub after installation of the second blade, followed by the installation of the third blade, FIG. 1e illustrates the lifting of the completed wind turbine from the well or trench for later transport to the installation site, e.g. the offshore installation site, e.g. for mounting onto a foundation of an offshore wind turbine, FIG. 2a shows a semi-submersible vessel with an installation crane and a mast-receiving well, FIG. 2b shows a cross-section of the vessel with the mast-receiving well, FIG. 2c shows the vessel of FIG. 2a with the mast arranged in the mast-receiving well, FIG. 2d shows the vessel of FIG. 2c with the nacelle mounted on top of the mast, FIG. 2e shows the mounting of a first blade to the nacelle using a blade handling apparatus on-board the vessel, FIG. 2f shows the wind turbine completely assembled, FIG. 3 illustrates an alternative embodiment of a blade handling apparatus according to the invention, FIG. 4 shows in side view another example of a semi-submersible vessel with an installation crane, FIG. 5 shows the hull of vessel of FIG. 4 in side view, FIG. 6 shows the hull of FIG. 5 from above, FIG. 7 shows a transverse section of the hull of the vessel of FIG. 4 illustrating the portside and starboard side mast-receiving wells, and FIG. 8 shows the vessel of FIGS. 4-7 anchored in proximity of a floating foundation on which a fully assembled wind turbine is to be installed using the crane of the vessel, FIG. 9 shows the vessel of FIGS. 4-8 and a floating foundation on which a wind turbine is to be installed, FIG. 10 shows the arrangement of FIG. 9 with the mast engaging devices deployed, FIG. 11 shows the installation of the fully assembled wind turbine onto the foundation using the vessel of FIGS. 4-10, and FIG. 12 illustrates the use of the vessel of FIGS. 4-11 for transporting, upending, and installing monopiles as foundation for a wind turbine.

FIG. 1a illustrates the placing of a full-height wind turbine mast 1 with nacelle 2 thereon into a well 12 or trench, here of an on-land production location according to the invention.

For example, the mast 1 has a height of more than 80 meters, e.g. more than 100 meters, e.g. about 130 meters.

The nacelle 2 has a horizontal axis hub 3 with three blade mounting structures 4, 5, 6 at 120° intervals as is common in the industry.

The production location has a well or trench 12 that allows to lower the mast 1, or part thereof, into the well or trench, so below the surface 15 on which the handling of the blades is organized.

For example, the well or trench 12 has a depth of at least 10 meters, e.g. at least 40 meters of the length of the mast. In the depicted example, the depth is about 65 meters. The well can be lined with a lining.

The well or trench 12 is equipped with a support 20 for keeping the mast 1 in upright position during installation (or de-installation) of blades. For example, the support is configured to retain a flange at the lower end of the mast and/or to engage the mast at one or more positions along the height of the mast 1, e.g. using clamps, slings, etc. For example, the support 20 is arranged within the well or trench and/or at the top of the well or trench, or (when no well or trench is present) on the surface 15 or at an elevated position above the surface, e.g. the support including a surface mounted installation tower with one or more support members configured for retaining the mast 1 at one or more elevated positions during fastening of the blades.

The FIG. 1b illustrates schematically a blade supply for supplying a blade to a horizontal supply position in the vicinity of the at least part of a mast 1. For example, the blade supply comprises a cradle or other support stationary located near the well or trench. Or the blade supply comprises blade conveyor devices, e.g. comprising one or more vehicles, that transport a blade 30 from a storage location to the location where the blade is to be fastened to the hub.

The FIG. 1b illustrates a blade handling apparatus 50 for transferring a blade 30 between the horizontal supply position and a fastening position and vice versa.

In the fastening position the blade 30 has a tilted orientation in which the root end 31 of the blade is aligned with a blade mounting structure 4. It is illustrated that the structure 4 is oriented in about the eight-o'clock orientation.

The blade handling apparatus 50 comprises:
a blade gripper 51 adapted for gripping the blade 30;
a base 52;
a boom 53 to which the blade gripper 51 is attached, here via a horizontal pivot axis 54.

The boom 53 is pivotal with respect to the base 52 in a boom pivot direction about a horizontal boom pivot axis 55 between a lowered position for gripping a blade in the horizontal supply position and a raised position in which the blade has said tilted orientation.

The apparatus further comprises, as preferred, one or more actuators 56 for manipulating the blade into the fastening position, e.g. configured to allow for introduction of bolts at the root end of the blade 30 into corresponding bolt holes of the mounting structure 4. In a preferred embodiment, the boom 53 is arranged and pivoted such that the actuators mainly need to perform a linear motion of the blade for this purpose, possibly combined with a rotation of the blade about a longitudinal axis for enhanced alignment of the bolts and the bolt holes.

For example, one or more actuators, e.g. hydraulic cylinders, are associated with the blade gripper 51 to perform a motion of the blade 30 into the fastening position, once the pivotal boom has brought the blade 30 into the desired tilted orientation.

The FIGS. 1b-1d illustrate that the blade handling apparatus 50 is configured for successive installation and/or de-installation of the three blades 30, 31, 32 of a wind turbine having a horizontal rotational hub 3 which is provided with three blade mounting structures 4, 5, 6 spaced by 120°. It is illustrated that the tilted orientation is the same for each of the three blades 30, 31, 32 associated with the hub, the hub being rotated over 120° between each installation or de-installation of a blade 30, 31, 32. This allow for a relatively simple design of the blade handling apparatus 50 compared to any design wherein blades are mounted to the hub in orientations that differ from one another.

It is illustrated that the tilted orientation, for each blade to be installed or de-installed using the blade handling apparatus, corresponds to about the eight-o'clock position, seen in front view onto the nacelle. It is shown that the blade to be fastened includes 30-40° with the horizontal.

The well or trench 12 is, as preferred, designed such that the nacelle is at an installation height relative to the supply position of the blade corresponding to 50-60% of the length of a blade.

It is illustrated that the base 51 is located in proximity of the support for the mast, here to the well or trench 12 provided with a support.

The boom 53 is pivotal in a plane through the blade mounting positions 4, 5, 6 of the hub of the wind turbine.

The boom pivot axis 55 is located closer to the base 51 of the apparatus than the root end of the blade 30 in the supply position.

The boom 53 is pivotal upward to the tilted orientation of the blade, here a single blade gripper being mounted on the boom and pivotal about a horizontal axis relative to the boom.

The boom 53 can be telescopic, e.g. telescoping between an extended and retracted length during the installation process of a blade and/or to allow for different situations, e.g. different effective heights of the nacelle and/or blade lengths.

The installation of the three blades 30, 31, 32 on the hub of the wind turbine, using the apparatus 50, comprises:
- positioning a first blade mounting structure 4 of the hub in alignment with the tilted orientation associated with the fastening position of the blade,
- supplying by means of the blade supply system a first blade 30 into the horizontal supply position;
- transferring by means of the blade handling apparatus 50 the first blade 30 into the fastening position relative to the first blade mounting structure 4;
- fastening the root end of the first blade 30 to the first blade mounting structure 4;
- disengaging the blade gripper 51 from the blade 30 and bringing the boom of the blade handling apparatus to the horizontal supply position;
- rotating the hub to position a second blade mounting structure 5 in alignment with the tilted orientation associated with the fastening position of the blade,
- supplying by means of the blade supply system a second blade 31 into the horizontal supply position;
- transferring by means of the blade handling apparatus the second blade 31 into the fastening position relative to the second blade mounting structure 5;
- fastening the root end of the second blade 31 to the second blade mounting structure 5,
- disengaging the blade gripper from the second blade and bringing the blade handling apparatus to the horizontal supply position,
- supplying by means of the blade supply system a third blade 32 into the horizontal supply position;
- transferring by means of the blade handling apparatus 50 the third blade into the fastening position relative to the third blade mounting structure 6;
- fastening the root end of the third blade 32 to the third blade mounting structure 6,
- disengaging the blade gripper 51 from the third blade 32 and bringing the blade handling apparatus to the horizontal supply position.

The depicted blade handling system of FIGS. 1a-1e is land-based, and the blades are installed using the blade handling system on land. It is envisaged that the wind turbine having at least, or just, the upper part of the mast, the nacelle and all blades is conveyed to an offshore installation site, e.g. where a soil-bound or floating foundation is located and where the wind turbine is mounted on the foundation.

With reference to FIGS. 2a-2f the use of a semi-submersible vessel in the on-board assembly of a wind turbine and the installation by means of a crane of the vessel of the assembled wind turbine on a foundation will be discussed.

The FIGS. 2a-2f illustrate a semi-submersible vessel 1000 which comprises a twin-pontoon floating hull with:
- a deckbox structure 1001;
- two parallel pontoons 1002, 1003,
- for each of the two pontoons 1002, 1003 an associated row of (here four; in other known embodiments three or two) support columns 1010-1013, 1014. These columns each extend upward from the respective pontoon. The deckbox structure 1001 is supported on all of the support columns. The columns contribute along with the pontoons to the buoyancy of the vessel.

Reference numeral 1004 indicates the bow of the vessel and 1005 the stern.

The deckbox structure 1001 has a deck 1006 and a box bottom 1007 that is above the waterline.

The vessel 1000 is provide with an installation crane 1100 that is mounted on the deckbox structure and is configured to install an assembled wind turbine on a foundation (not shown) that is present within reach of the crane 1100.

As is known in the art, the foundation can be a seabed mounted or fixed foundation, e.g. a monopile foundation or a jacket-type foundation. In another embodiment, e.g. for deeper water, the foundation is a floating foundation, e.g. a spar type foundation, e.g. as in the Hywind project, or as disclosed in WO2009/131826.

The depicted crane 1100 is a tub mounted crane, wherein the slewable superstructure 1101 of the crane is mounted via a bearing, e.g. a roller bearing or an arrangement of bogies, on a tub 1102 that is integral with the deckbox structure 1001. As shown and preferred, the crane 1100 is arranged directly above a support column 1010 at the end of a row of columns.

The crane 1100 has a pivotal boom 1103 that is pivoted up and down by means of a luffing mechanism, here comprising winch driven luffing cables 1104 extending between the boom 1103 and a gantry structure of the superstructure 1101.

The crane 1100 has a reach with a capacity to handle a completely assembled wind turbine on its own, as will be explained herein.

In other embodiment, the crane is a mast crane.

Generally, as is known in the art, a completely assembled wind turbine that is to be installed on an offshore foundation comprises at least a part of a wind turbine mast, preferably the entire mast, and a rotor assembly that is mounted on the mast, commonly a nacelle having a hub, which rotor assembly is, preferably, provided with one or more, e.g. all, of the rotor blades, ahead of installation on the foundation.

It is envisaged that the assembly of the wind turbine is at least in part done on-board the vessel 1000.

Preferably, even when the foundation is a floating foundation, the vessel 1000 is located at the offshore windfarm, e.g. moored adjacent the foundation at its final location in the windfarm, when performing one of more of the assembly step for assembly of the wind turbine.

It is illustrated in FIGS. 2a-2f that at an assembly station on-board of the vessel 1000, the hull of the vessel is provided with a mast-receiving well 1040 that is sunk into, or through, the hull.

As can best be seen in FIGS. 2a and 2b, in embodiments, the well 1040 extends from a top opening 1041 thereof, e.g. flush with the deck of the vessel, into a support column 1011 of the hull.

The well 1040 is configured to receive therein at least a portion of the mast of the wind turbine during an assembly step of the wind turbine, e.g. during mounting of the rotor assembly, here nacelle, on the mast and/or during assembly of one or more, e.g. all, of the rotor blades to the rotor assembly.

By way of example, the depicted vessel 1000 has a breadth of 100 meters, a length of the deckbox of 180 meters, a height of the deckbox of 12 meters, a height of the columns of 24 meters, a height of the pontoons of 14 meters. The columns have a horizontal cross-section of at least 20×20 meters.

The total height between the deck and the bottom of the pontoons is, in this example, 50 meters. This height, as well as the structural strength and integration of the column in the hull, allows for effective implementation of the well 1040 in the column.

The available height in the hull of a semi-submersible vessel allows for the well 1040 to be embodied so as to receive therein a significant portion of the total mast of the wind turbine in the course of the assembly of the wind turbine.

The well 1040 may extend to a bottom end or floor of the well that is located in the column. As shown, in another embodiment, the mast-receiving well extends through the entire height of the support column and even into the pontoon under the column.

As shown, the well 1040 has a floor 1050, which is, preferably, configured for the mast to stand thereon. It is illustrated here that the floor 1050 is integrated with the structure, e.g. bulkheads, walls, of the pontoon and/or with the support column, e.g. with a lower section of the support column.

It will be appreciated that the mast-receiving well 1040 can be retrofitted in existing semi-submersible (heavy lift) crane vessels.

It is illustrated that, as preferred, the mast-receiving well 1040 is arranged within reach of the installation crane 1100.

It is illustrated that the installation crane 1100 is mounted directly above a support column 1010 at the end of a row of columns, so practically at a corner of the deckbox structure 1001, and the mast-receiving well 1040 is provided in the adjacent support column 1011 of the same row of columns on the pontoon.

The crane 1100 has sufficient lifting capacity, as preferred, to use the crane 1100 to place an entire wind turbine mast 1200, or an upper part thereof (e.g. having a length between 40-65% of the total mast) in the well 1040 and to later remove the assembled, or partly assembled wind turbine from the well, the wind turbine then being placed by the crane 1100 on the foundation.

In embodiments, as known in the art, the vessel has two, possible identical, cranes 1100, each fitted at a corresponding corner, e.g. at the stern, of the deckbox structure.

In an embodiment, the vessel 1000 has in addition to the crane 1100 configured to installation of the assembled, or partly assembled, wind turbine on the offshore foundation, a further crane mounted to the hull of lower hoisting capacity than the crane 1100. For example, an additional crane is provided for handling of wind turbine components, e.g. the mast, or mast parts, and/or the nacelle between storage locations therefore on the deck of the vessel and one or more assembly stations arranged within reach of the crane 1100.

As explained herein, an embodiment of the well 1040 having a depth of at least 30 meters, e.g. over 40 meters, allows for receiving a significant portion of the entire mast of a wind turbine in the well, e.g. as mast heights may vary between 75 and 110 meters in practical embodiments for offshore wind turbines.

FIG. 2c illustrates that an entire wind turbine mast 1200 has been placed in the well 1040, the mast having a height between 75 and 110 meters in this example. As can be seen, due to the placement of the mast 1200 in the well, the top of the mast is closer to the deck, which facilitates operations like mounting the nacelle on the mast top, mounting one or more, e.g. all, blades to the nacelle, etc.

FIG. 2d illustrates that a nacelle 1250 has been lifted on top of the mast 1200, here by means of the crane 1100. The nacelle 1250 may have been stored in a storage area on the deck of the vessel.

In embodiments, this subassembly of mast 1200 and nacelle 1250, devoid of any blades, is lifted by means of the crane 1100 out of the well 1040 and then the crane 1100 is swung into a position wherein the mast is above the offshore foundation. The partly assembled wind turbine is then placed on the foundation and secured thereto. In a further assembly step, e.g. using the crane 1100, the blades 1275, 1276, 1277 are fitted to the nacelle.

In another approach, the nacelle 1250 is already, e.g. onshore, provided with two of the blades ahead of placing the nacelle on top of the mast. This approach is known in the field as the bunny ears approach. Then, only one further blade is installed once the wind turbine has been placed on the foundation. This can be done with the crane 1100, for example.

It is preferred, for one or more the blades 1275, 1276, 1277 to be mounted to the nacelle 1250 whilst mounted on the mast 1200, with the mast being received at least in part in the well 1040.

FIG. 2e illustrates that one by one the blades 1275, 1276, 1277 are mounted to the nacelle 1250. Once all, here three, blades are mounted to the hub of the nacelle, the wind turbine 1280 is completely assembled and ready to the lifted out of the well 1040 and placed on the foundation using the crane 1100.

FIG. 2e illustrates that, as preferred, not the installation crane 1100 is used for the mounting of the blades 1275, 1276, 1277 to the nacelle, but a blade handling apparatus 1300 that is configured for transferring a blade between the horizontal supply position and a fastening position, e.g. a tilted or horizontal fastening position.

FIG. 2e illustrates that the blade handling apparatus 1300 is placed on the deck of the vessel.

For example, as schematically shown, the apparatus 1300 is configured to bring the blade in a fastening position in which the root end of the blade is aligned with a blade mounting structure, wherein the blade handling apparatus comprises:

a blade gripper adapted for gripping the blade;
a base;
a pivotal boom, e.g. an articulated boom, to which the one or more blade grippers are attached, which boom is movable between a lowered position for gripping a blade in the horizontal supply position and a raised position in which the blade has said fastening orientation;
preferably, one or more actuators, e.g. on the boom, for manipulating the blade into the fastening position.

FIG. 2e illustrates an embodiment, wherein the horizontal rotational hub is provided with three blade mounting structures spaced by 120°, and wherein the fastening orientation is a tilted orientation, preferably for each blade to be installed using the blade handling apparatus 1300, corresponds to about the four-o'clock or to about the eight-o'clock position, seen in front view onto the nacelle, e.g. wherein the blade includes 30-40° with the horizontal.

FIG. 2e illustrates that, in an embodiment, the tilted orientation is the same for each of the three blades associated with the hub, the hub being rotated over 120° between each installation of a blade.

The FIG. 2f illustrates the completed assembly, all steps having been performed at a single assembly station on-board of the vessel 1000, here at the well 1040.

The FIGS. 2a-2f illustrate that, in embodiments, the nacelle 1250 is fitted on the mast 1200 so that the front of the nacelle, where the blades are fitted to the hub of the nacelle, faces outwards relative to a long side of the hull of the vessel. As preferred, and as shown, the axis of then hub is not perpendicular to the long side of the hull of the vessel, yet at an angle (when seen from above) between said perpendicular line and the side of the hull.

The FIG. 2f illustrates that a benefit of this arrangement of the hub of the nacelle as well as of arranging the well 1040 into or through a support column, is that one blade of the fully assembled wind turbine may extend outside of the hull, rather close to the deckbox and the crane 1100.

The apparatus 1300 may, not shown, have an articulated boom allowing to bring the blade in a horizontal fastening position for fastening the blade to the hub of the nacelle.

In another approach, not shown, it is envisaged that the well 1040 extends entirely through the hull, e.g. through a support column and then further down through the pontoon. In the latter version the well resembles a moonpool or shaft entirely through the hull, e.g. allowing for operations wherein the mast of the wind turbine sticks out below the bottom of the pontoon of the vessel. In such an open bottomed well, the mast or part thereof can be suspended, e.g. by means of winch driven cables, e.g. said cables engaging on the lower end of the mast.

The extension of the well through the hull, may, in embodiments, allow for the nacelle 1250 to be mounted on the top of the mast without the need for use of a crane. For example, the mast (or mast part) is suspended in the well such that the top thereof is in proximity of the deck. For example, this allows for the nacelle to be moved substantially horizontally over the deck, e.g. by one or more vehicles or by a cart, e.g. over rails mounted on deck, e.g. skidded by a skid cart, in order for the nacelle to be positioned over the mast top end and connected thereto. For example, the mast is then lifted over part of its height, e.g. using the crane 1100 or the suspension device that suspends the mast in the well 1040, to a height that is suited for mounting one or more blades to the nacelle, e.g. as discussed above.

In embodiments, the well 1040 extends through the deckbox structure at a location remote from any of the support columns of the hull, e.g. in the spacing between two support columns. For example, an additional well sidewall, e.g. tubular sidewall, is then fitted between the deckbox structure and the pontoon to provide a dry well in which the mast or mast part is to be placed.

The FIG. 3 illustrates an alternative embodiment of a blade handling apparatus 150 according to the invention.

In contrast to the apparatus 50 discussed herein, the boom structure is an articulated boom structure comprising a first boom member 153a and a second boom member 153b that is pivotal relative to the first boom member 153a.

The first boom member 153a is pivotal with respect to the base 152 in a boom pivot direction about a horizontal boom pivot axis 154, and a further horizontal boom pivot axis 155 is present between the members 153a, b.

The blade gripper 151 is attached to the second boom member 153b, here, as preferred, via a further pivot assembly which at least provides a horizontal pivot axis 156 between the blade gripper 151 and the boom member 153b.

As illustrated the articulated boom structure is movable in a vertical plane motion thereof between a lowered position for gripping a blade 30 in the horizontal supply position of the blade 30 and a raised position in which the blade has a horizontal fastening orientation at the height of the nacelle.

It will be appreciated that the handling apparatus 150 can be deployed on-board the vessel 1000 as replacement of the depicted embodiment of apparatus 1300.

In an embodiment, the pivot assembly between the second boom member 153b and the blade gripper 151 also allows for a rotary motion of the blade about an axis perpendicular to the plane of the boom motion, e.g. to adjustment of the blade by such rotation to the orientation of the mounting on the nacelle.

With reference to FIGS. 4 to 8 another example of a semi-submersible vessel 1000 with an installation crane 1150 will be discussed.

The FIGS. 4-8 illustrate a semi-submersible vessel 1000 which comprises a twin-pontoon floating hull with:
- a deckbox structure 1001;
- two parallel pontoons, namely a portside pontoon 1002 and a starboard-side pontoon 1003,
- for each of the two pontoons 1002, 1003 an associated row of (here two) support columns 1010, 1011, 1012, 1013. These columns each extend upward from the respective pontoon.

The deckbox structure 1001 is supported on all of the support columns. The columns contribute along with the pontoons to the buoyancy of the vessel.

Reference numeral 1004 indicates the bow of the vessel and 1005 the stern.

The deckbox structure 1001 has a deck 1006 and a box bottom 1007 that is above the waterline. The deck 1001 is configured for storage of wind turbine components thereon, e.g. nacelles, blades, masts or mast parts.

The vessel 1000 is provide with a single installation crane 1150 that has a crane structure base 1151 that is fixed on a part of the deckbox structure 1001 that extends between a portside support column 1010 and a starboard side support column 1012.

The crane 1150 is mounted on the centreline of the hull.

The crane 1150 is mounted at the bow side of the deckbox structure.

The crane 1150 has a reach and hoisting capacity to handle a completely assembled wind turbine on its own, as will be explained herein. The crane 1150 is configured to install an assembled wind turbine 1280 on a foundation 2000, see FIG. 8, that is present within reach of the crane 1150, here at the bow side of the vessel.

For example, the wind turbine is a 15 MW wind turbine with a total mass of 2500 ton when fully assembled. The crane 1150 can handle this load.

For example, the turbine has a COG at max 91.5 meter above the mounting flange at the lower end of the mast.

For example, the diameter of the mast is max 12 meter at the lower end thereof.

It is illustrated that the support columns 1010, 1012 supporting the portion of the deckbox structure, here bow portion, where the single installation crane 1150 is mounted on, each have a significantly larger horizontal cross-section and thus buoyancy than the two other support columns. This not only allows for effective integration of the mast-receiving wells 1040a,b into each of these columns 1010, 1012, but also provides for increased buoyancy at this end of the vessel in view of the mass of the crane 1150, as well as the one or more wind turbines handled by the crane in this area.

In the FIG. 4, the longitudinal dimension of each column 1010, 1012 is about 60 meters, the rest of the hull being on scale in this figure as well as the other depictions of this hull.

The vessel 1000, preferably, has a water ballast system that is configured to control the vessels draught, heel and trim. Preferably, the ballast system has dedicated water ballast tanks to counteract the effect of loading and unloading turbines. Preferably, there are dedicated quick ballast tanks which are located "in line" with the loadline of the installation crane which can be operated so that no additional trim angle is generated when installing a wind turbine on a foundation.

Emergency quick release water ballast tanks may be provided, which are preferably situated in the forward support columns 1010, 1012. These tanks are configured to release water in case of an emergency, e.g. without requiring a pump, e.g. mounted above operational waterline during wind turbine installation.

It is envisaged that the assembly of the wind turbine 1280 is, at least in part, done on-board the vessel 1000.

As preferred, the vessel 1000 is located at the offshore windfarm, e.g. moored adjacent the foundation 2000 at its final location in the windfarm, when performing one of more, e.g. all, of the assembly steps for assembly of the wind turbine 1280 to be installed on the foundation.

The depicted exemplary floating foundation 2000 is of the type as disclosed in WO2009/131826.

Generally, the foundation comprises a mast mounting structure configured to mount the mast of the wind turbine thereon and having an upwardly directed mounting axis. The foundation may be of any design, for example a spar type foundation (e.g. as in the Hywind project).

For example, as shown, the floating foundation 2000 comprises three or more interconnected and buoyant stabilizing columns, e.g. three stabilizing columns interconnected by beams in a triangular arrangement, e.g. an equilateral triangle, when seen from above.

For example, the floating foundation 2000, e.g. each buoyant column thereof, is provided with one or more ballast tanks for containing a ballast, e.g. a ballast liquid, e.g. ballast water.

In an embodiment, a ballast control system is provided in the foundation 2000 which is configured for moving the ballast water between ballast tanks, e.g. of the at least three stabilizing columns, to adjust a vertical orientation of the mounting axis.

In an embodiment, as shown, one of the stabilizing columns of the floating foundation is embodied with a mast mounting structure 2001 configured to mount the mast of the wind turbine thereon.

In an embodiment, as shown, the floating foundation 2000 comprises one or more water-entrapment plates, e.g. each of the plates being attached to a lower end of one of the stabilizing columns.

The vessel of FIGS. 4-8 can also install the wind turbine 1280 on a sea-bed mounted or fixed foundation, e.g. a monopile foundation or a jacket-type foundation.

The vessel 1000 and wind turbine installation crane 1150 thereof can also be used for installation of a fixed foundation, e.g. a monopile, on the seabed.

A portside mast-receiving well 1040a extends in the portside support column 1010 and a starboard side mast-receiving well 1040b extends in the starboard-side support column 1012. So, generally, the wells 1040a, b are located at opposite sides of the crane 1150.

The mast-receiving wells 1040a, b are each configured to receive therein at least a portion of the mast of the wind turbine during an assembly step of the wind turbine, e.g. during mounting of the rotor assembly, here nacelle, on the mast and/or during assembly of one or more, e.g. all, of the rotor blades to the rotor assembly. For example, the wells each have dimensions to receive there a mast with a diameter of at least 5 meters, e.g. at least 10 meters, e.g. at least 12 meters.

The available height in the hull of a semi-submersible vessel allows for the wells 1040a,b to be embodied so as to receive therein a significant portion of the total mast height of the wind turbine 1280 in the course of the assembly of the wind turbine.

The wells 1040a,b, as illustrated, each extend through the entire height of the deckbox structure, the respective support column, and even into the pontoon 1002, 1003 under the column.

As shown, the wells 1040a,b each have a floor 1050, which is, preferably, configured for the mast to stand thereon. It is illustrated here that the floor 1050 is integrated with the structure, e.g. bulkheads, walls, of the pontoon and/or with the support column, e.g. with a lower section of the support column. Here the pontoon has a double walled design.

It is illustrated that, as preferred, each of the mast-receiving wells 1040a,b is arranged within reach of the installation crane 1150 allowing for use of the crane 1150 at each well.

The installation crane 1150 has a slewable superstructure 1155 that is supported on the crane structure base 1151 via a slew bearing 1152 allowing to revolve the superstructure, preferably over 360 degrees, about a vertical slew axis.

The superstructure 1155 comprises a rigid and vertically extending crane structure top section 1156 that is supported on the crane structure base via the slew bearing 1152. As preferred, the top section is formed primarily by lattice work.

The vertically extending crane top section extends at least 50 meters or more above the deck of the deckbox structure of the vessel.

As illustrated the crane 1150 is of vast dimensions. For example, the bridge of the vessel as well as crew accommodations are provided within the structure of the crane base 1151, which is embodied accordingly. Another part of the crew accommodation can be arranged in the forward part of the deckbox structure.

For example, the slew bearing 1152, which also may comprise multiple slew bearings at different heights when desired, may have a diameter of at least 15 meters, e.g. at least 20 meters, e.g. about 30 meters. Such dimension slew bearings are known, e.g. embodied as multi-race roller bearings, for example from the cranes on the Sleipnir crane vessel.

A boom 1158 is mounted to the crane structure top section 1156, here to a top thereof, as preferred, so as to revolve along with the crane structure top section during slewing.

The boom 1158 is, possibly, pivotally connected for pivoting about a horizontal pivot axis by means of a luffing mechanism, which allows to set the effective reach for each job. In another example, the boom is held by a rigid luffing member at a preselected angle.

The boom 1158 may have various designs, including two boom members side-by side that allow for a part of the turbine, e.g. an upwards directed blade, the nacelle, and/or the mast to be located and/or pass between the boom members. For example, the two boom members diverge from one another in a Y arrangement or the two boom members are generally parallel to one another, here with a V-shape bracing.

The installation crane 1150 has a main hoisting system comprising at least one main hoisting winch 1160, an associated main hoisting cable 1161 and a load connector 1162. The main hoisting cable extends from the main hoisting winch to a main hoist cable guide on the boom and then to the load connector. As shown, the load connector here is formed in part by an upper actively controlled mast engaging device 1400, from which pendants 1163 extend to a fitting on the lower portion of the mast, e.g. via the lower device 1450

The installation crane 1150 is configured to carry out:
in a first slewing position thereof, a hoisting operation during an assembly step of the wind turbine performed at the portside mast-receiving well 1040a,
in a second slewing position thereof, a hoisting operation during an assembly step of the wind turbine performed at the starboard-side mast-receiving well 1040b, and
a hoisting of an assembled wind turbine 1280 out of the portside or the starboard side mast-receiving well, and then a slewing operation to an installation slew position wherein the wind turbine is clear of the deckbox structure at the bow side where the installation crane is located and over a foundation 2000 onto which the wind turbine 1280 is to be installed in one single hoist job, followed by a lowering of the wind turbine 1280 onto the foundation.

It is illustrated that the installation crane 1150 is provided, at one or more positions along the height of the crane structure, with at least one mast engaging device 1400, 1450 having a mast engagement member as well as an actively controlled motion mechanism that is configured and may be operated to provide a controlled motion of the mast engagement member in a horizontal plane so as to bring and maintain the mast of the suspended wind turbine 1280 in one or more desired positions and/or tilted orientations, e.g. into alignment with the mounting axis of the foundation.

It is illustrated that the crane 1150 has an upper mast engaging device 1400 as well as a lower mast engaging device 1450, each having a mast engagement member as well as an actively controlled motion mechanism that is configured and operated to provide a controlled motion of the mast engagement member, e.g. an annular member having jaws that can open and close about the mast, in a horizontal plane. These mast engaging devices act 1400, 1450 on the mast at different heights, e.g. the lower one below the center of gravity G of the wind turbine to be installed and the upper one above said center of gravity.

The one or more mast engaging devices 1400, 1450 may be employed to stabilize the (partly assembled or fully assembled) wind turbine during slewing of the crane 1150, when the engagement device is mounted on the slewable top section or mounted (the lower device) on another carrier that follows the slewing motion. Other clamps or mast stabilizer devices may also be provided on the slewing top section 1156 for such stabilizing, e.g. as alternative for the devices 1400, 1450.

The active controlled motion mechanisms of the one or more mast engaging devices 1400, 1450 may be operated during the installation step of the wind turbine 1280 on the (floating) foundation 2000, e.g. to bring and maintain the mast of the suspended wind turbine in alignment with the mounting axis of the floating foundation.

In an embodiment, as illustrated, each actively controlled horizontal motion mechanism of devices 1400 and 1450 comprises a first set of one or more horizontal tracks extending in a first horizontal direction, e.g. in Y-direction perpendicular to the centerline of the hull, said first set supporting at least one first carrier, and said first carrier supporting a second set of one or more horizontal tracks extending in a second horizontal direction different from the first direction, e.g. in X-direction along the centerline, e.g. the first and second direction being orthogonal directions, the second set of one or more horizontal tracks supporting one or more further second carriers supporting the mast engagement device, e.g. an annular clamp having jaws for opening and closing the clamp about the mast.

As illustrated, each mast engaging device 1400, 1450 comprises a trolley 1401, 1451 that is vertically guided along one or more vertical guide rails mounted on the crane 1150, the trolley supporting the mast engaging member with interposition of the actively controlled motion mechanism between the trolley and the mast engaging member to provide a controlled motion of the mast engagement member in a horizontal plane, e.g. in two orthogonal horizontal directions. For example, the motion range afforded by the trolleys and the motion mechanisms is 12 meters in X direction, 12 meters in Y direction, and 6 meters in Z-direction.

FIG. 4 illustrates that, in addition to the crane 1150 configured to installation of the assembled, or partly assembled, wind turbine on the offshore foundation, a further crane 1180 is mounted to the hull, e.g. of lower hoisting capacity than the crane 1150.

For example, the additional crane 1180 is provided for handling of wind turbine components, e.g. the mast, or mast parts, and/or the nacelle between storage locations therefore on the deck of the vessel and one or more assembly stations arranged within reach of the crane 1100, e.g. at one or both of the wells 1040a,b.

For example, the crane 1180 is embodied as described in WO2014/014343, as illustrated.

For example, the additional crane 1180 is a marine knuckle boom crane comprising:
a stationary pedestal 1181 fixed to the deckbox structure; and
a crane housing 1182, which is rotational relative to the pedestal about a vertical slew axis;
a knuckle boom assembly attached to the crane housing; the knuckle boom assembly comprising:
a main boom 1183 comprising an inner end, a central area and an outer end, the inner end of which is connected pivotably about a first horizontal pivot axis to a lower portion of the crane housing; and
a jib 1184 comprising an inner end, a central area and a tip opposite the inner end of the jib, the inner end of which is connected pivotably about a second horizontal pivot axis to the outer end of the main boom;
wherein the jib is pivotable at least between an extended position in which the tip extends mainly forward from the main boom, and a folded position in which the jib is folded back, essentially parallel along the main boom.

As explained herein, an embodiment of the well 1040a,b having a depth of at least 30 meters, e.g. about 35 meters as shown here, allows for receiving a significant portion of the entire mast of a wind turbine in the well, e.g. as mast heights may vary between 75 and 110 meters in practical embodiments for offshore wind turbines.

The crane 1150 and wells 1040a,b can be used in the process of on-board assembly of the wind turbine 1280 in various manners.

For example, the location with the well 1040a can be used primarily as a nacelle mounting station, where the nacelle 1250 is hoisted onto the mast 1200 which is partly sunk into the well 1040a. This could be done using crane 1150, or crane 1180 when present and configured accordingly. For example, in embodiments, the mast 1200 is assembled from mast parts at the same station. Assembly of the nacelle 1250 may involve bolting the nacelle onto the mast, but also a range of related installation work, like establishing electrical connections, fitting wiring through the mast, testing, etc.

The crane 1150 can have one or more mobile access ramps or platforms at elevated heights for providing access to the turbine from the outside.

For example, the location with the well 1040b can be used primarily as a blade installation station. The mast 1200 with the nacelle 1250 assembled at the other station is then lifted out of well 1040a and by slewing the crane 1150 transferred to the other station, where the mast is lowered into well 1040b. Then the blades 1275, 1276, 1277 are fitted to the hub of the nacelle 1250, so as to complete the assembly of the wind turbine 1280.

As discussed, a blade handling apparatus 1300 can be provided, which is configured for transferring a blade between the horizontal supply position and a fastening position, e.g. a tilted or horizontal fastening position. For example, the apparatus 1300 is mounted on deck, e.g. along a side of the hull where the blade assembly station is located. For example, the apparatus is mounted to the crane 1150, e.g. to the base thereof, e.g. vertically mobile along the base of the crane.

Once all, here three, blades have been mounted the wind turbine 1280 is completely assembled and ready to be lifted out of the well 1040b and placed on the foundation 2000 using the crane 1150. This entails slewing the crane 1150, with the assembled wind turbine 1280 suspended, e.g. about 2500 tonnes, to a position above the mast mounting structure of the foundation 2000.

In embodiments, the nacelle 1250 is fitted on the mast 1200 so that the front of the nacelle, where the blades are fitted to the hub of the nacelle, faces outwards relative to a long side of the hull of the vessel, e.g. the blades being outside the hull to avoid interference.

In embodiments, the crane 1150 and two wells 1040a,b can be used in a method wherein two wind turbines 1280 are assembled in part simultaneously as the mast of a first wind turbine is placed in one well, e.g. well 1040a, for mounting of the nacelle 1250 thereon, whereas at the same time, an already manufactured sub-assembly of mast and nacelle of a second wind turbine is placed in the other well 1040b, so that this subassembly can be provided with blades at this other assembly station of the vessel in reach of the crane 1150.

This allows for increased production capacity on-board of the vessel, as well as efficiency, e.g. as personnel dedicated to nacelle installation can proceed with the next wind turbine, whilst the preceding sub-assembly is fitted with blades at the other station.

It is illustrated that, in addition to the one or more mast engaging devices 1400, 1450, the vessel is, preferably, equipped with a restraining device 1600 that acts as a restraint between the vessel 1000 and the foundation, e.g. at least in the horizontal X-Y plane relative to the vessel, e.g. the floating foundation 2000.

Preferably, as shown, this restraining device 1600 is embodied generally similar to the one or more mast engagement devices 1400, 1450.

As preferred, the restraining device 1600 is mounted on a trolley that is vertically mobile, e.g. along vertical rails mounted on the hull, e.g. the deckbox, of the vessel, e.g. said rails being inline with rails for mast engagement devices 1400, 1450.

As for the mast engagement devices 1400, 1450, the restraint device 1600 has a foundation engagement device, e.g. a clamp as shown in the figures that clamps about a portion of the foundation, and an actively controlled motion mechanism between the trolley and the foundation engagement device, e.g. of similar design with orthogonal tracks as well.

In operation, the mast engagement devices 1400, 1450—providing actively controlled longitudinal and transverse compensation—allow to eliminate or reduce significantly the x- and y-motions as follows from roll, pitch, yaw, surge and sway. The restraint device 1600 is used to grip the wind turbine foundation, and reduce relative motion, at least in X-Y plane.

Control systems related to one or more of devices 1400, 1450, 1600 to achieve compensation of motions may be fed by one or more motion reference units, e.g. on-board the vessel and optionally on the foundation, e.g. when floating, and, optionally, a wave radar for the actual and the prediction of relative motions.

In embodiments, the vessel 1000 is also used for transportation and/or installation of foundations, e.g. monopiles or jackets. For example, the installation crane 1150 is used for upending the monopile from the deck, and then hoist and slew the monopile to the forward installation position For example, one or more monopiles can be stored vertically within reach of the installation crane. For example, one or more monopiles are stored horizontally on the deck.

In embodiments, the vessel has a monopile gripper for installation of the monopile. For example, the restraint device 1600 described herein also is operable as X-Y compensated monopile gripper used for holding and guiding the monopile during installation into the seabed.

It is illustrated that the vessel 1000 has thrusters as well as mooring winches fore and aft allowing to sail with the vessel as well as for positioning and mooring. For example, the vessel 1000 is held by eight anchor lines during wind turbine installation. For example, eight steerable azimuth thruster are installed, four thrusters per pontoon; two in the forward side and two in the aft side of each pontoon. For example, the thrusters are mounted in an underwater demountable canister for replacement and maintenance of the thrusters. The canisters can be lowered by a lifting frame to the seabed and lifted to the surface by the deck crane It is illustrated that the deckbox structure is extended aft by a console 1015 accommodating air intake ducts as well as exhaust ducts for combustion type generators/engines onboard the vessel 1000. This is done to keep the deck free as much as possible of obstacles, e.g. for storage and/or skidding operations, e.g. when upending mast, mast parts, or monopiles. It also keeps exhaust gasses away from the deck of the vessel.

For example, engines/generators are placed in one or more rooms at the stern end of the deckbox structure.

It is envisaged that at least some of the engines/generators use liquefied gas, e.g. LNG, as fuel. Others, for example, may run on diesel fuel. For example, LNG bunker tanks are housed in a central region of the deckbox structure, e.g. close to the vessels centre of gravity to limit impact on trim and heel, e.g. not above any of the support columns and clear of the installation crane 1150.

FIG. 9 shows the vessel 1000 and floating foundation 2000 on which a wind turbine 1280 is to be installed using crane 1150. The restraint device 1600 couples the vessel 1000 to the foundation in X-Y directions, with active control mechanism thereof allowing for control of position and motions in this horizontal plane. The vertical motion of the foundation 2000 relative to the vessel 1000 is not restrained but will be compensated for by heave motion compensation of the crane 1150.

The devices 1400, 1450 are shown in folded, here upwardly folded, position and can be deployed so that their annular engagement member clamp around the mast 1200. This is shown in FIG. 10.

The completed wind turbine 1280 can now be lifted out of the well 1040b, the crane top section 1156 then slewing to align the mast 1200 with the mounting structure 2001. Then the turbine is mated with the foundation 2000.

FIG. 11 shows the installation of the fully assembled wind turbine onto the foundation using the vessel 1000, using the combined operation of devices 1400, 1450 and 1600 to align the mast 1200 and the mast mounting structure.

In FIG. 11 it is illustrated that, as is optional, a hatch is placed over the one or more wells 1040a, b, e.g. allowing for another function to be performed at the respective station.

FIG. 12 illustrates the use of the vessel 1000 for transporting, upending, and installing monopiles 3000 as foundation for a wind turbine 1280.

It is shown that monopiles 3000 can be stored on deck horizontally and can be moved, e.g. skidded transversely, e.g. from the two sides of the deck, to the centerline. At centerline the monopile 3000 will be upended using the installation crane 1150. For example, a movable upending bucket can travel from the aft side of the deck to an auxiliary side of the installation crane opposite the forward-facing installation side of the crane.

Once upended, the monopile 3000 can be parked on deck, e.g. over a well 1040b closed temporarily by a bottom support 3003 for the monopile. The monopile 3000 can be moved into the installation position by slewing the crane top section 1156.

It is illustrated that the device 1600 may have the dual functionality of restraint device as well as monopile gripper for installation of the monopile 3000 using a hammering device 3002 also handled by the crane 1150.

The invention claimed is:

1. A semi-submersible crane vessel for use in assembling a wind turbine and for installation by a crane of the vessel of the assembled wind turbine on a foundation, wherein the assembled wind turbine to be installed comprises at least a part of a wind turbine mast and a rotor assembly that is mounted on the mast,
wherein the vessel comprises:
a floating hull with:
a deckbox structure;
two parallel pontoons; and
a row of support columns extending upward from each of the two pontoons, the support columns supporting thereon the deckbox structure,
wherein the deckbox structure has a deck and a box bottom; and
an installation crane mounted on the deckbox structure and configured to install the assembled wind turbine on the foundation,
wherein, at an assembly station, the hull of the vessel is provided with a mast-receiving well that extends into or through a support column of the hull,
the well being configured to receive therein at least a portion of the mast of the wind turbine during an assembly step of the wind turbine, and wherein the mast-receiving well has an unobstructed opening, the opening having a width of at least 5 meters and a depth of at least 15 meters measured from the deck of the deckbox structure.

2. The vessel according to claim 1, wherein the installation crane is mounted directly above a support column at the end of a row of columns, and wherein the mast-receiving well is provided in the adjacent support column of the same row of columns on the pontoon.

3. The vessel according to claim 1, wherein the semi-submersible vessel has a portside pontoon and a starboard-side pontoon, wherein the installation crane has a crane structure base fixed on a part of the deckbox structure that extends between a portside support column and a starboard side support column, at one of the bow side and stern side of the deckbox structure.

4. The vessel according to claim 1, wherein the semi-submersible vessel has a portside pontoon and a starboard-side pontoon, and wherein a portside mast-receiving well extends in a portside support column and a starboard side mast-receiving well extends in a starboard-side support column.

5. The vessel according to claim 4, wherein the installation crane has a slewable superstructure supported on the crane structure base via a slew bearing allowing to revolve the superstructure about a vertical slew axis, and wherein the installation crane is configured to carry out:
in a first slewing position thereof, a hoisting operation during an assembly step of the wind turbine performed at the portside mast-receiving well;
in a second slewing position thereof, a hoisting operation during an assembly step of the wind turbine performed at the starboard-side mast-receiving well; and
a hoisting of an assembled wind turbine out of the portside or the starboard side mast-receiving well, and then a slewing operation to an installation slew position wherein the wind turbine is clear of the deckbox structure at the bow side or stern side where the installation crane is located and over a foundation onto which the wind turbine is to be installed, followed by a lowering of the wind turbine onto the foundation.

6. The vessel according to claim 1, wherein the installation crane has a slewable superstructure supported on the crane structure base via a slew bearing allowing to revolve the superstructure about a vertical slew axis, wherein the superstructure is provided with a boom, and wherein the crane has a main hoisting system comprising at least one main hoisting winch, an associated main hoisting cable and a load connector, the main hoisting cable extending from the main hoisting winch to a main hoist cable guide on the boom and then to the load connector.

7. The vessel according to claim 1, wherein the superstructure comprises a rigid and vertically extending crane structure top section supported on the crane structure base via the slew bearing, wherein the boom is mounted to the crane structure top section, so as to revolve along with the crane structure top section, wherein the top section is formed by lattice work, and wherein the vertically extending crane top section extends at least 50 meters above the deck of the deckbox structure of the vessel.

8. The vessel according to claim 7, wherein a boom is connected to the top of the vertically extending crane top section, pivotally connected for pivoting about a horizontal pivot axis by means of a luffing mechanism of the installation crane.

9. The vessel according to claim 1, wherein the semi-submersible vessel has a blade handling system for use in installing and/or de-installing of a blade of the wind turbine during the assembly step of the wind turbine, said wind turbine having a nacelle with a horizontal rotational hub provided with blade mounting structures, the nacelle being supported on at least an upper part of a of the mast of the wind turbine, wherein each blade has a tip end, a root end, and a length, the system comprising:

a blade supply for supplying a blade to a horizontal supply position in the vicinity of the at least part of a mast;

a blade handling apparatus for transferring a blade between the horizontal supply position and a fastening position and vice versa, wherein in the fastening position the blade has a tilted orientation or horizontal orientation in which the root end of the blade is aligned with a blade mounting structure, and wherein the blade handling apparatus comprises:

a blade gripper adapted for gripping the blade;

a base;

a boom structure to which the blade gripper is attached, the boom structure being movable between a lowered position for gripping a blade in the horizontal supply position and a raised position in which the blade has said fastening orientation; and one or more actuators for moving the blade gripper relative to the boom structure when in the fastening orientation; and wherein the blade handling apparatus is in proximity to the mast-receiving well, wherein the blade handling apparatus is arranged and configured to install and/or de-install the blades of the wind turbine with the mast sunk partially into the well.

10. The vessel according to claim 9, wherein the horizontal rotational hub is provided with three blade mounting structures spaced by 120°, and wherein the fastening orientation is a tilted orientation, for each blade to be installed or de-installed using the blade handling apparatus, corresponding to about the four-o'clock or to about the eight-o'clock position, seen in front view onto the nacelle.

11. The vessel according to claim 9, wherein the blade handling apparatus is configured for successive installation and/or de-installation of the three blades of a wind turbine having a horizontal rotational hub which is provided with three blade mounting structures spaced by 120°, and wherein the fastening orientation is the same for each of the three blades associated with the hub, the hub being rotated over 120° between each installation or de-installation of a blade.

12. The vessel according to claim 9, wherein the blade handling system further comprises a support for the at least upper part of the mast, supporting the at least upper part of the mast such that the nacelle is at an installation height relative to the supply position corresponding to 50-60% of the length of a blade.

13. The vessel according to claim 9, wherein the mast of the wind turbine comprises an upper part and a lower part, the upper part supporting the nacelle, wherein a connector is provided to allow mounting the upper part of the mast together with the nacelle and the blades installed on the hub onto the lower part.

14. The vessel according to claim 1, further comprising a blade handling apparatus in proximity to the well, wherein the blade handling apparatus is arranged and configured to install and/or de-install the blades of the wind turbine with the mast sunk partially into the well.

15. The semi-submersible crane vessel of claim 1, wherein the vessel is equipped with a restraining device that acts as a restraint between the vessel and the foundation, at least in a horizontal X-Y plane relative to the vessel.

16. The semi-submersible crane vessel according to claim 1, wherein the mast-receiving well has a floor which is configured for the mast to stand thereon, the floor being integrated with a respective pontoon and/or with a lower section of a respective support column.

17. A method for assembling a wind turbine and for installation of the assembled wind turbine on a foundation, wherein use is made of a semi-submersible crane vessel, wherein the vessel comprises:

a floating hull with:
  a deckbox structure;
  two parallel pontoons; and
  a row of support columns extending upward from each of the two pontoons, the support columns supporting thereon the deckbox structure,
wherein the deckbox structure has a deck and a box bottom; and
an installation crane mounted on the deckbox structure and configured to install the assembled wind turbine on the foundation,
wherein, at an assembly station, the hull of the vessel is provided with a mast-receiving well that extends into or through a support column of the hull, the well having an unobstructed opening with a diameter of at least 5 meters and being configured to receive therein at least a portion of the mast of the wind turbine,
wherein the assembled wind turbine to be installed comprises at least a part of a wind turbine mast and a rotor assembly mounted on the mast, and
wherein, during an assembly step of the wind turbine and/or during assembly of one or more of the rotor blades to the rotor assembly, the mast is arranged at least with a portion thereof in the mast-receiving well.

18. The method according to claim 17, wherein the semi-submersible vessel has a portside pontoon and a starboard-side pontoon, wherein a portside mast-receiving well extends in a portside support column and a starboard side mast-receiving well extends in a starboard-side support column, wherein the installation crane has a slewable superstructure supported on a crane structure base via a slew bearing allowing to revolve the superstructure about a vertical slew axis, wherein the installation crane is configured and operated to carry out:
in a first slewing position thereof, a hoisting operation during an assembly step of the wind turbine performed at the portside mast-receiving well;
in a second slewing position thereof, a hoisting operation during an assembly step of the wind turbine performed at the starboard-side mast-receiving well; and
a hoisting of an assembled wind turbine out of the portside or the starboard side mast-receiving well, and then a slewing operation to an installation slew position wherein the wind turbine is clear of the deckbox structure at the bow side or stern side where the installation crane is located and over a foundation onto which the wind turbine is to be installed, followed by a lowering of the wind turbine onto the foundation.

19. The method according to claim 18, wherein two wind turbines are assembled in part simultaneously as the mast of a first wind turbine is placed in one well, for mounting of the nacelle thereon, whereas at the same time, an already manufactured sub-assembly of mast and nacelle of a second wind turbine is placed in the other mast-receiving well, where this subassembly is provided with blades.

* * * * *